(12) United States Patent
Kuwada et al.

(10) Patent No.: US 10,194,058 B2
(45) Date of Patent: Jan. 29, 2019

(54) COLOR PROCESSING DEVICE, IMAGE FORMING APPARATUS, AND IMAGE FORMING SYSTEM FOR MATCHING THE COLOR OF PRINTED MATERIALS OUTPUT IN THE PAST

(71) Applicant: FUJI XEROX CO., LTD., Tokyo (JP)

(72) Inventors: Yoshitaka Kuwada, Kanagawa (JP); Jungo Harigai, Kanagawa (JP); Ryosuke Higashikata, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 76 days.

(21) Appl. No.: 15/246,637

(22) Filed: Aug. 25, 2016

(65) Prior Publication Data

US 2017/0201655 A1    Jul. 13, 2017

(30) Foreign Application Priority Data

Jan. 8, 2016  (JP) ................................ 2016-002282

(51) Int. Cl.
*H04N 1/60* (2006.01)
*G06K 15/02* (2006.01)
*H04N 1/405* (2006.01)
*H04N 1/387* (2006.01)

(52) U.S. Cl.
CPC ......... *H04N 1/6055* (2013.01); *G06K 15/188* (2013.01); *G06K 15/1836* (2013.01); *H04N 1/3878* (2013.01); *H04N 1/405* (2013.01); *H04N 1/6008* (2013.01); *H04N 2201/0091* (2013.01)

(58) Field of Classification Search
None
See application file for complete search history.

(56) References Cited

U.S. PATENT DOCUMENTS 6,404,517 B1 *   6/2002   Chao .................... H04N 1/6033
                                            358/406
6,512,845 B1 *   1/2003   Haikin .................... H04N 1/56
                                            358/406

(Continued)

FOREIGN PATENT DOCUMENTS

JP    2013-30996  A    2/2013
JP    2013-232750 A    11/2013

*Primary Examiner* — Paul F Payer
(74) *Attorney, Agent, or Firm* — Sughrue Mion, PLLC

(57) ABSTRACT

A color processing device includes a color data acquisition section that acquires color data of a first image output by a first image forming device on a basis of image data, a variation acquisition section that acquires a degree of color variation of the image data, a misregistration acquisition section that acquires an amount of misregistration between the image data and the color data in a region exhibiting a high degree of color variation, a first-relationship generation section that generates, after misregistration correction, a first relationship in a region exhibiting a low degree of color variation, and a conversion relationship generation section that generates a conversion relationship in accordance with the first relationship and a second relationship provided for a second image forming device such that colors of a second image to be output by the second image forming device and the first image are made to match.

13 Claims, 15 Drawing Sheets

(56) References Cited

U.S. PATENT DOCUMENTS

| | | | | |
|---|---|---|---|---|
| 7,038,811 B1 * | 5/2006 | Haikin | ............... | H04N 1/6033 358/1.15 |
| 7,385,739 B2 * | 6/2008 | Ohga | ............... | H04N 1/6011 345/589 |
| 7,800,779 B2 * | 9/2010 | Fan | ............... | H04N 1/6033 358/1.9 |
| 7,978,366 B2 * | 7/2011 | Ming | ............... | H04N 1/6055 358/1.9 |
| 8,203,768 B2 * | 6/2012 | Klassen | ............... | H04N 1/4078 358/1.9 |
| 8,681,379 B2 * | 3/2014 | Nakamura | ............... | H04N 1/6055 358/1.15 |
| 8,928,935 B2 * | 1/2015 | Such | ............... | B44D 3/003 101/484 |
| 9,098,792 B2 * | 8/2015 | Shin | ............... | H04N 1/6055 |
| 2013/0027759 A1 | 1/2013 | Nakamura | | |

* cited by examiner

|  |  | 1009.2 | 935.1 |  |  |  |  |
|---|---|---|---|---|---|---|---|
|  | 922.43 |  | 698.23 | 1046.5 |  |  |  |
| 934.38 | 313.99 | 803.88 |  | 687.51 | 303.64 |  |  |
| 1246.9 | 438.61 | 464.56 |  |  | 376.17 |  |  |
|  | 570.5 | 345.95 |  |  |  |  |  |
|  |  |  |  |  |  |  |  |
|  |  | 704.33 | 358.84 |  |  |  |  |
|  |  | 1403.4 | 1269.3 |  |  | 593.85 |  |
|  |  | 996.84 | 703.8 |  |  |  |  |
|  |  | 826.9 | 388.21 |  |  |  |  |
|  |  | 991.35 |  |  |  |  |  |
|  | 328.91 | 479.69 | 462.34 |  |  | 605.68 | 503.52 |

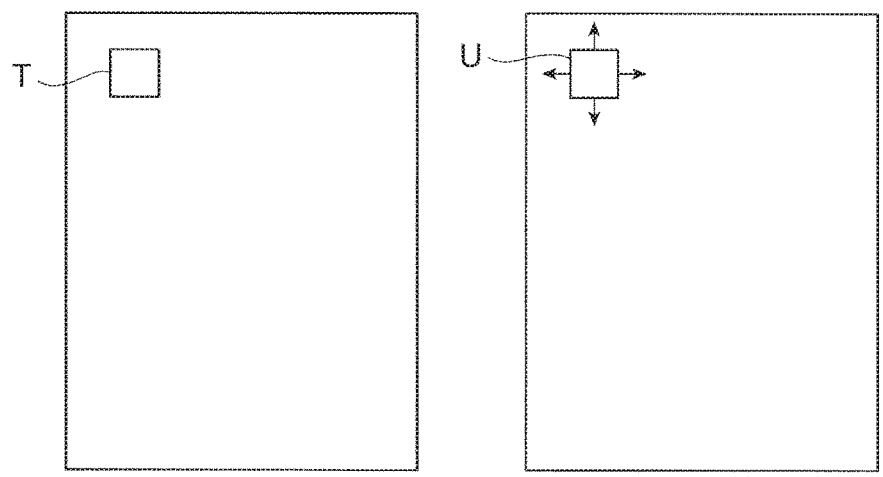

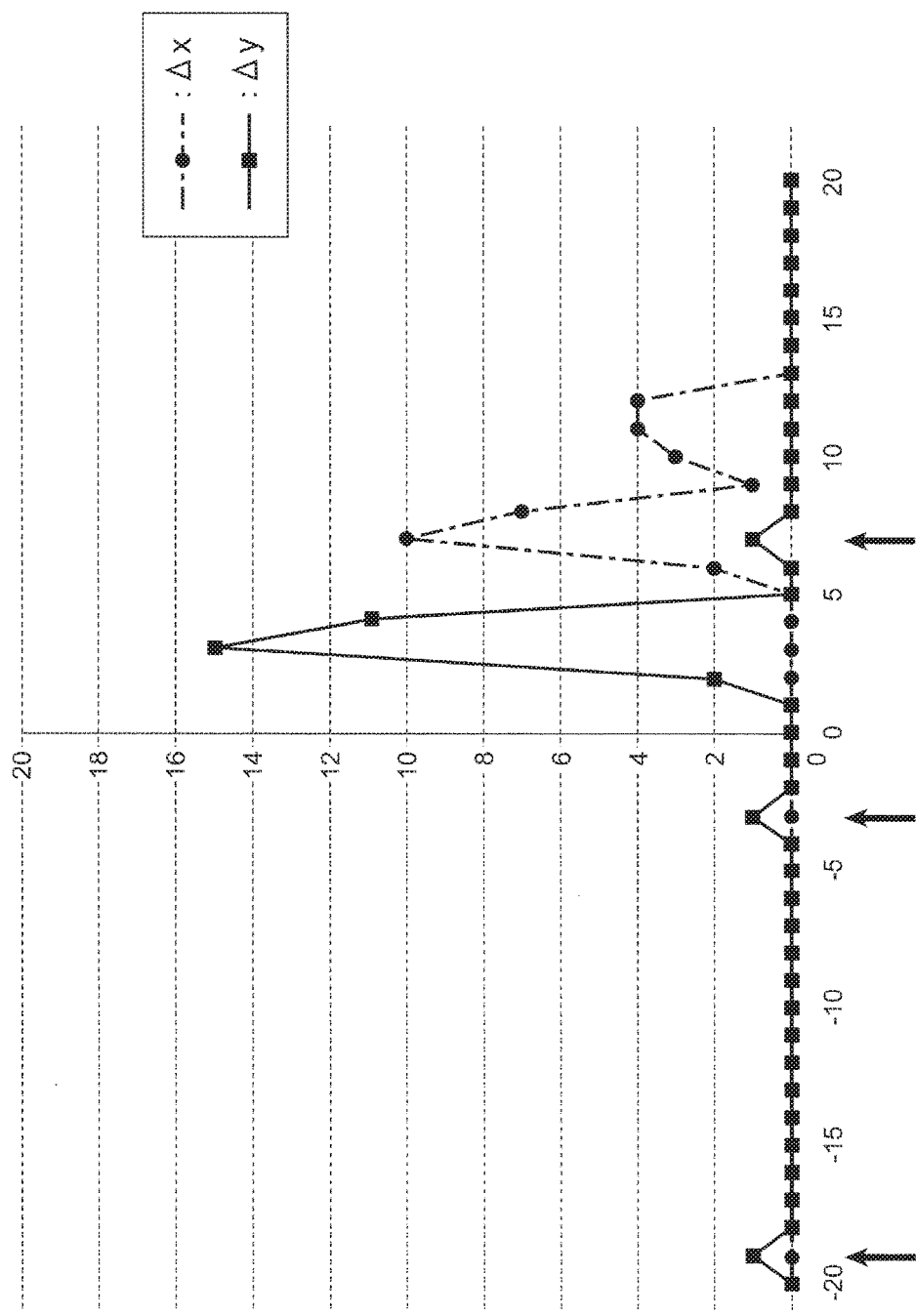

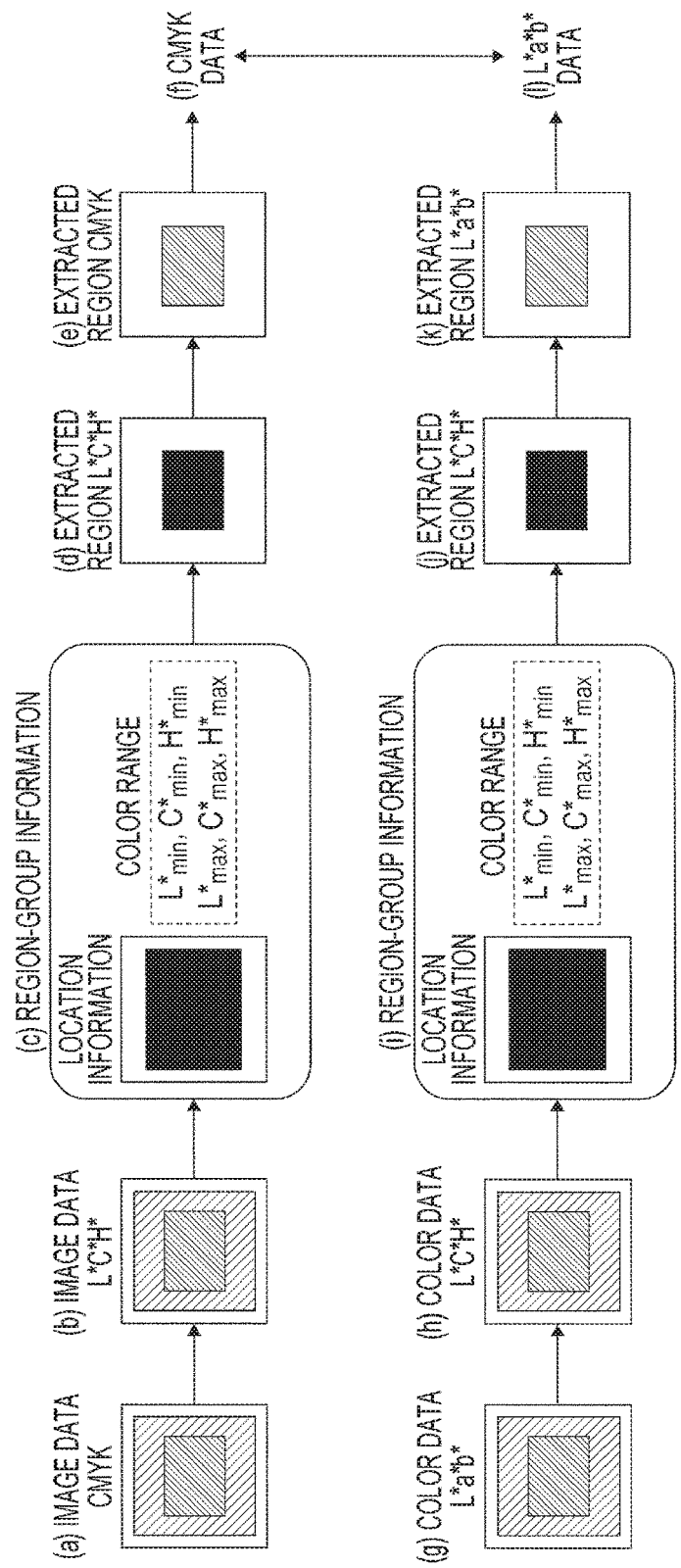

COLOR PROCESSING DEVICE, IMAGE FORMING APPARATUS, AND IMAGE FORMING SYSTEM FOR MATCHING THE COLOR OF PRINTED MATERIALS OUTPUT IN THE PAST

CROSS-REFERENCE TO RELATED APPLICATIONS

This application is based on and claims priority under 35 USC 119 from Japanese Patent Application No. 2016-002282 filed Jan. 8, 2016.

BACKGROUND (i) Technical Field

The present invention relates to color processing devices, an image forming apparatus, and an image forming system.

(ii) Related Art

In recent years, offset printing machines have been gradually and increasingly replaced with on-demand digital printing machines in the printing market. An example of an on-demand printer usage is reprinting. In reprinting, in some cases, an on-demand printer is used for a small number of copies after an offset printing machine is used for a large number of copies, and in other cases, only an on-demand printer is used without using an offset printing machine.

To adjust the colors of printed materials output in such reprinting to match the colors of printed materials output in the past, there is a need to generate a color conversion profile through colorimetry performed on color patches printed in the past and to output the printed materials using the same print output setting (such as a color conversion profile setting) as those in the past.

SUMMARY

According to an aspect of the invention, there is provided a color processing device including a color data acquisition section, a variation acquisition section, a misregistration acquisition section, a first-relationship generation section, and a conversion relationship generation section. The color data acquisition section acquires color data of a first image output by a first image forming device on a basis of image data. The variation acquisition section acquires a degree of color variation of the image data. The misregistration acquisition section acquires an amount of misregistration between the image data and the color data in a region exhibiting a high degree of color variation. The first-relationship generation section generates a first relationship in a region exhibiting a low degree of color variation after registration is performed by correcting the misregistration. The first relationship is a relationship between the image data and the color data. The conversion relationship generation section generates a conversion relationship in accordance with the first relationship and a second relationship that corresponds to the first relationship for a second image forming device. The conversion relationship is used for performing color adjustment on a second image to be output by the second image forming device on the basis of the image data. The color adjustment is performed to adjust a color of the second image to match a color of the first image.

BRIEF DESCRIPTION OF THE DRAWINGS

An exemplary embodiment of the present invention will be described in detail based on the following figures, wherein:

FIG. 9A is a diagram for explaining template matching;

FIG. 9B is a table illustrating $\Delta x$ in scan rectangles extracted by the misregistration acquisition section;

FIG. 9C is a table illustrating $\Delta y$ in the scan rectangles extracted by the misregistration acquisition section;

FIG. 11 is a histogram generated for $\Delta x$ and $\Delta y$;

FIG. 13 is a diagram for explaining a first example of Step 1 in which a first-relationship generation section generates a first relationship;

DETAILED DESCRIPTION

Overall Configuration of Image Forming System

An exemplary embodiment of the invention will be described in detail with reference to the drawings.

Figure 1:
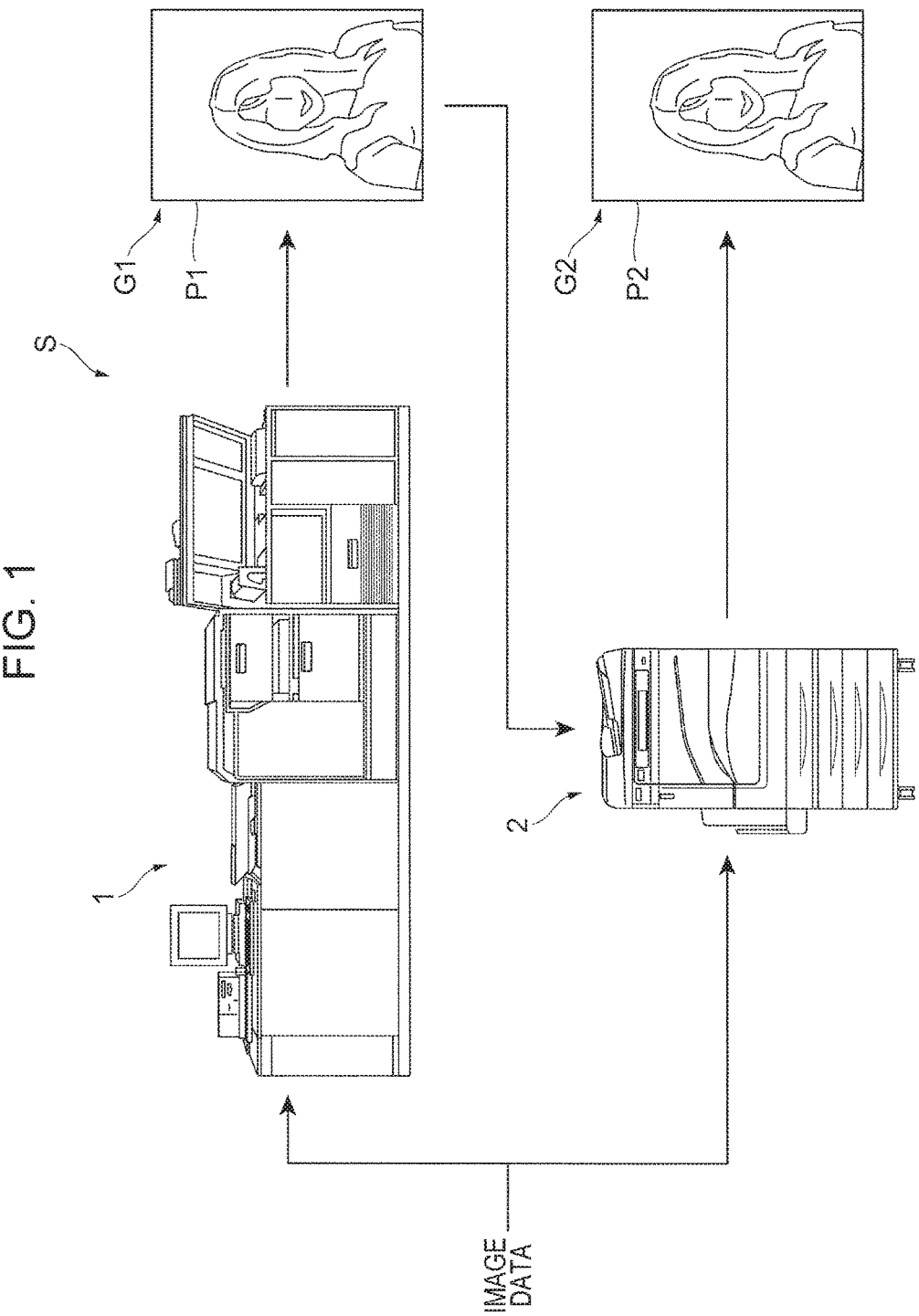
FIG. 1 is a diagram illustrating an example of an overall configuration of an image forming system according to the exemplary embodiment.

FIG. 1 is a diagram illustrating an example of an overall configuration of an image forming system according to the exemplary embodiment.

An image forming system S illustrated in FIG. 1 includes an image forming apparatus 1 and an image forming apparatus 2.

Each of the image forming apparatuses 1 and 2 is a printing mechanism that forms an image on a medium (recording medium) on the basis of image data and uses at least one type of a color material. The image data is provided for an image corresponding to a print job transmitted from, for example, a user. The image forming apparatuses 1 and 2 will be described in detail later.

Each of the image forming apparatuses 1 and 2 uses, for example, an electrophotographic system in the exemplary embodiment. After the printing on a medium, each of the image forming apparatuses 1 and 2 outputs the medium as a printed material to the outside. FIG. 1 illustrates a case where the image forming apparatus 1 forms an image G1 (first image) on a sheet of paper (paper sheet) P1 and outputs the paper sheet P1 and where the image forming apparatus 2 forms an image G2 (second image) on a paper sheet P2 and outputs the paper sheet P2.

The image forming apparatus 2 includes at least an image reading device 100 that reads an image, and the image reading device 100 reads the image G1 formed on the paper sheet P1. This will be described in detail later.

Image Forming Apparatus Overview

An overview of the image forming apparatuses 1 and 2 will be described. The image forming apparatuses 1 and 2 basically have the same configuration, and the image forming apparatus 2 will hereinafter be described taken as an example.

Figure 2:
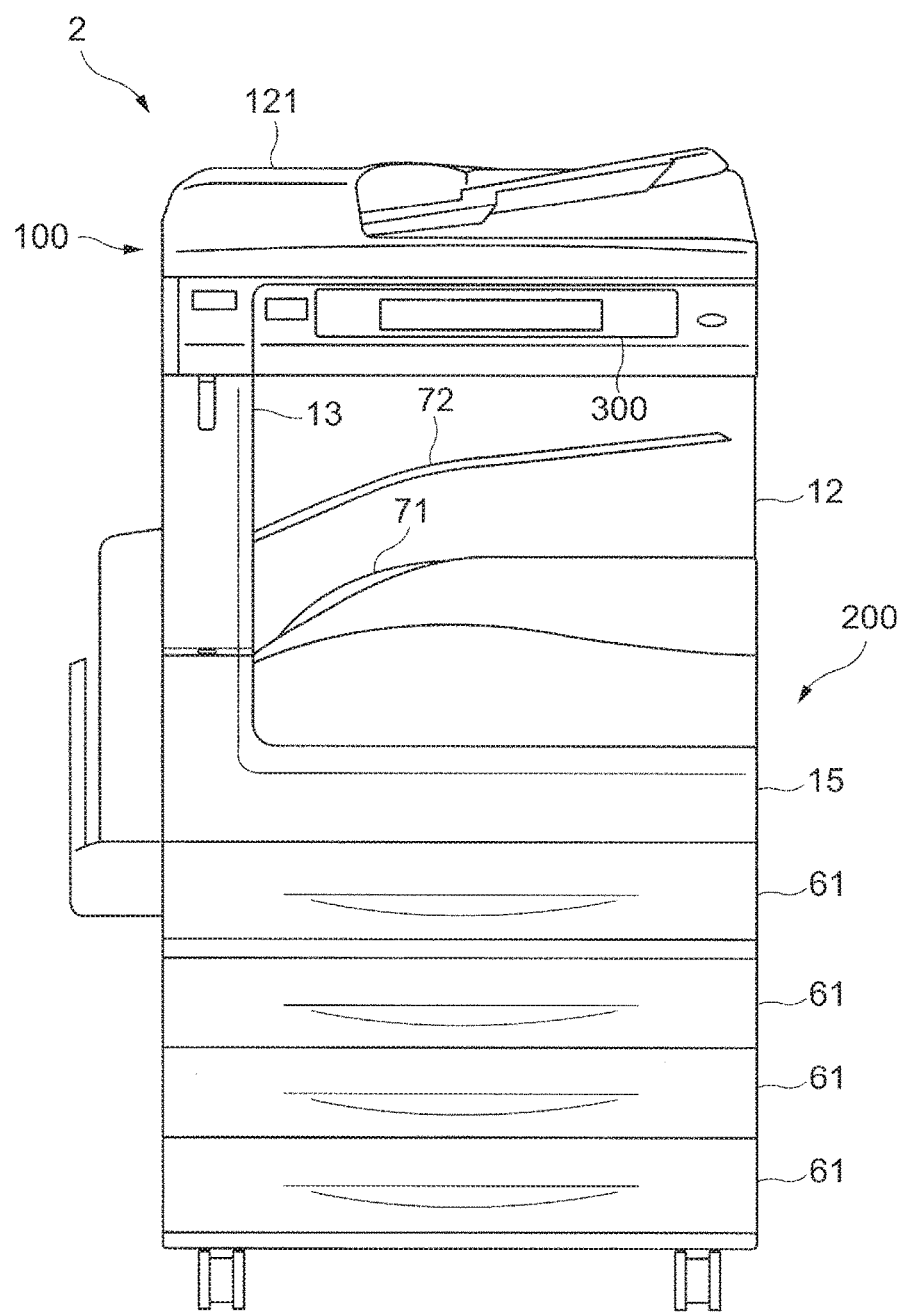
FIG. 2 is a diagram illustrating the appearance of the image forming apparatus according to the exemplary embodiment.
Figure 3:
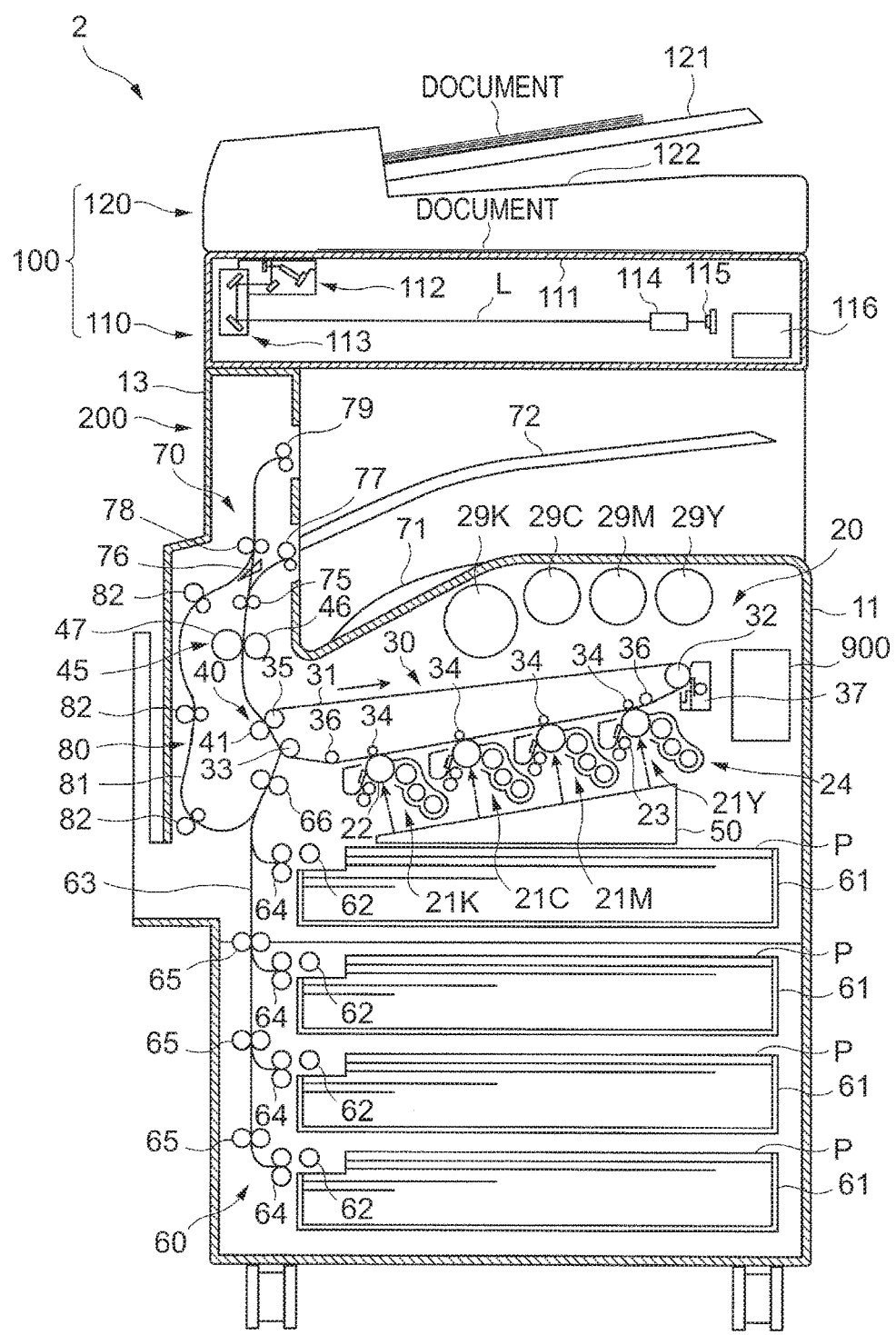
FIG. 3 is a diagram illustrating the internal structure of the image forming apparatus according to the exemplary embodiment.

FIG. 2 is a diagram illustrating the appearance of the image forming apparatus 2 according to the exemplary embodiment. FIG. 3 is a diagram illustrating the internal structure of the image forming apparatus 2 according to the exemplary embodiment.

The image forming apparatus 2 includes the image reading device 100 that reads the image of a document and an image recording device 200 that is an example of an image forming device that forms an image on a medium on the basis of image data. The image recording device 200 functions as a first image forming device in the image forming apparatus 1 and functions as a second image forming device in the image forming apparatus 2. The image forming apparatus 2 further includes a user interface (UI) 300 and a controller 900. The UI 300 receives user operation input and displays various pieces of information to the user. The controller 900 controls overall operations of the image forming apparatus 2.

The image reading device 100 is an example of an image reading device and is disposed in an upper portion of the image forming apparatus 2. The image recording device 200 is disposed under the image reading device 100 and has the controller 900 incorporated in the image recording device 200. The user interface 300 is disposed on the side closer to the user in the upper portion of the image forming apparatus 2, that is, the side, closer to the user, of an image reading section 110 (described later) of the image reading device 100.

The image reading device 100 will first be described.

The image reading device 100 includes the image reading section 110 that reads the image of a document and a document transport section 120 that transports the document to the image reading section 110. The document transport section 120 and the image reading section 110 are respectively disposed in an upper portion and a lower portion of the image reading device 100.

The document transport section 120 includes a document tray 121 that accommodates the document and a document discharge section 122 to which the document transported from the document tray 121 is discharged. The document transport section 120 transports the document from the document tray 121 to the document discharge section 122.

The image reading section 110 includes a platen glass 111, a light irradiating unit 112, a light guide unit 113, and an imaging lens 114. The light irradiating unit 112 radiates light L onto a read surface (image surface) of the document. The light guide unit 113 guides the light L reflected from the read surface of the document. The imaging lens 114 forms an optical image of the light L guided by the light guide unit 113. The image reading section 110 also includes a detector 115 and an image processing section 116. The detector 115 includes photoelectric conversion elements, such as a charge coupled device (CCD) image sensor, which photoelectrically convert the image of the light L formed through the imaging lens 114. The detector 115 detects the formed optical image. The image processing section 116 is electrically connected to the detector 115 and receives electric signals obtained by the detector 115.

The image reading section 110 reads not only the image of the document transported by the document transport section 120 but also the image of the document placed on the platen glass 111.

The image recording device 200 will be described.

The image recording device 200 includes an image forming section 20, a medium supply section 60, a medium discharge section 70, and a reversing section 80. The image forming section 20 forms an image on a medium. The medium supply section 60 supplies the image forming section 20 with a paper sheet P. The medium discharge section 70 discharges the paper sheet P on which the image forming section 20 forms the image. The reversing section 80 turns over the paper sheet P having a surface on which the image forming section 20 forms the image. The reversing section 80 transports the paper sheet P again to the image forming section 20.

The image forming section 20 includes four image forming units 21 (21Y, 21M, 21C, and 21K) for yellow (Y), magenta (M), cyan (C), and black (K) that are arranged parallel to and a predetermined distance away from each other. Each image forming unit 21 includes a photoconductor drum 22, a charger 23 that uniformly charges the surface of the photoconductor drum 22, and a developer 24 that develops and makes visible an electrostatic latent image formed by laser radiated by an optical system unit 50 (described later) by using predetermined color-component toner. The image forming section 20 also includes toner cartridges 29Y, 29M, 29C, and 29K for respectively supplying color toner to the developers 24 of the image forming units 21Y, 21M, 21C, and 21K.

The image forming section 20 includes the optical system unit 50 below the image forming units 21Y, 21M, 21C, and 21K, the optical system unit 50 radiating a laser beam onto the photoconductor drums 22 of the respective image forming units 21Y, 21M, 21C, and 21K. The optical system unit 50 includes semiconductor laser (not illustrated), a modulator (not illustrated), a polygon mirror (not illustrated) for deflective scanning of the laser beam emitted from the semiconductor laser, a glass window (not illustrated) through which the laser beam passes, and a frame (not illustrated) for hermetically enclosing the components.

In addition, the image forming section 20 includes an intermediate transfer unit 30, a second transfer unit 40, and a fixing device 45. The intermediate transfer unit 30 transfers color toner images respectively formed on the photoconductor drums 22 of the image forming units 21Y, 21M, 21C, and 21K onto an intermediate transfer belt 31 in such a manner as to superpose the color toner images on each other. The second transfer unit 40 transfers, onto a paper sheet P, a toner image formed on the intermediate transfer unit 30 through the superposition. The fixing device 45 heats and presses the toner image formed on the paper sheet P to thereby fix the toner image on the paper sheet P.

The intermediate transfer unit 30 includes the intermediate transfer belt 31, a drive roller 32 that drives the intermediate transfer belt 31, and a tension roller 33 that provides the intermediate transfer belt 31 with a predetermined tension. The intermediate transfer unit 30 also includes multiple (four in the exemplary embodiment) first transfer rollers 34 and a backup roller 35. Each first transfer roller 34 faces the corresponding photoconductor drum 22 across the intermediate transfer belt 31 and is provided to transfer the toner image formed on the photoconductor drum 22 onto the intermediate transfer belt 31. The backup roller 35 faces a second transfer roller 41 (described later) across the intermediate transfer belt 31.

The intermediate transfer belt 31 is stretched around multiple rotary members such as the drive roller 32, the tension roller 33, the first transfer rollers 34, the backup roller 35, and driven rollers 36. The intermediate transfer belt 31 is driven to be rotated at a predetermined speed in the arrow direction by the drive roller 32 rotated by a drive motor (not illustrated). The intermediate transfer belt 31 is made of, for example, rubber or resin.

The intermediate transfer unit 30 also includes a cleaning device 37 that removes remaining toner and the like on the intermediate transfer belt 31. The cleaning device 37 removes the remaining toner, paper powder, and the like from the surface of the intermediate transfer belt 31 having undergone the toner image transfer process.

The second transfer unit 40 includes the second transfer roller 41 that is disposed at the second transfer location and that performs second transfer of an image onto the paper sheet P by pressing the intermediate transfer belt 31 against the backup roller 35. The second transfer roller 41 and the backup roller 35 that faces the second transfer roller 41 across the intermediate transfer belt 31 define the second transfer location where the toner image transferred onto the intermediate transfer belt 31 is transferred onto the paper sheet P.

The fixing device 45 uses a heat fixing roller 46 and a pressure roller 47 to heat and press the image (toner image) having undergone the second transfer performed by the intermediate transfer unit 30. The fixing device 45 thereby fixes the image onto the paper sheet P.

The medium supply section 60 includes medium containers 61, a feed roller 62, a transport path 63, and transport rollers 64, 65, and 66. Each medium container 61 contains media on which images are to be recorded. The feed roller 62 is used to feed paper sheets P contained in the medium container 61. Each paper sheet P fed with the feed roller 62 is transported through the transport path 63. The transport rollers 64, 65, and 66 are arranged along the transport path 63 and are used to transfer the paper sheet P fed with the feed roller 62 to the second transfer location.

The medium discharge section 70 includes a first stacking tray 71 and a second stacking tray 72. The first stacking tray 71 is disposed above the image forming section 20, and media on which the image forming section 20 forms images are stacked on the first stacking tray 71. The second stacking tray 72 is disposed between the first stacking tray 71 and the image reading device 100, and media on which the image forming section 20 forms images are stacked on the second stacking tray 72.

The medium discharge section 70 includes a transport roller 75 and a switching gate 76. The transport roller 75 is disposed downstream of the fixing device 45 in a first transport direction and used to transport the paper sheet P having the toner image fixed thereon. The switching gate 76 is disposed downstream of the transport roller 75 in the first transport direction and performs switching between a second transport direction to the first stacking tray 71 and a third transport direction to the second stacking tray 72 for transporting the paper sheet P. The medium discharge section 70 also includes a first discharge roller 77 that is disposed downstream of the switching gate 76 in the second transport direction (rightwards in FIG. 3) that is switched to by the switching gate 76, the first discharge roller 77 being used to discharge the paper sheet P to the first stacking tray 71. The medium discharge section 70 also includes a transport roller 78 and a second discharge roller 79. The transport roller 78 is disposed downstream of the switching gate 76 in the third transport direction (upwards in FIG. 3) that is switched to by the switching gate 76, the transport roller 78 being used to discharge the paper sheet P to the second stacking tray 72.

The reversing section 80 includes a reversing path 81 that is disposed at the side of the fixing device 45 and through which the paper sheet P is transported, the paper sheet P being turned over by rotating the transport roller 78 in a direction opposite from the direction of discharging the paper sheet P to the second stacking tray 72. The reversing path 81 is provided with multiple transport rollers 82 arranged along the reversing path 81. The paper sheet P transported with the transport rollers 82 is transported again to the second transfer location by using the transport rollers 82.

The image recording device 200 also includes a body frame 11 and a housing 12. The body frame 11 directly or indirectly supports the image forming section 20, the medium supply section 60, the medium discharge section 70, the reversing section 80, and the controller 900. The housing 12 is attached to the body frame 11 and forms an outer surface of the image forming apparatus 1.

The body frame 11 includes an image-reading-device supporting section 13 including the switching gate 76, the first discharge roller 77, the transport roller 78, the second discharge roller 79, and other components and extending vertically to support the image reading device 100 on one lateral end portion of the image forming apparatus 1. The image-reading-device supporting section 13 together with a part of the body frame 11 farther from the user supports the image reading device 100.

The image recording device 200 also includes a front covering 15 that is part of the housing 12, that is disposed on a side, of the image forming section 20, closer to the user, and that is attached to the body frame 11 to be openable.

By opening the front covering 15, the user may replace any one of the intermediate transfer unit 30 and the toner cartridges 29Y, 29M, 29C, and 29K of the image forming section 20 with new one.

The user interface 300 is, for example, a touch panel. When the touch panel is used as the user interface 300, various pieces of information such as image forming setting for the image forming apparatus 1 are displayed on the touch panel. The user touches the touch panel to perform operations of inputting the image forming setting and the like.

Example of Functional Configuration of Controller

Figure 4:
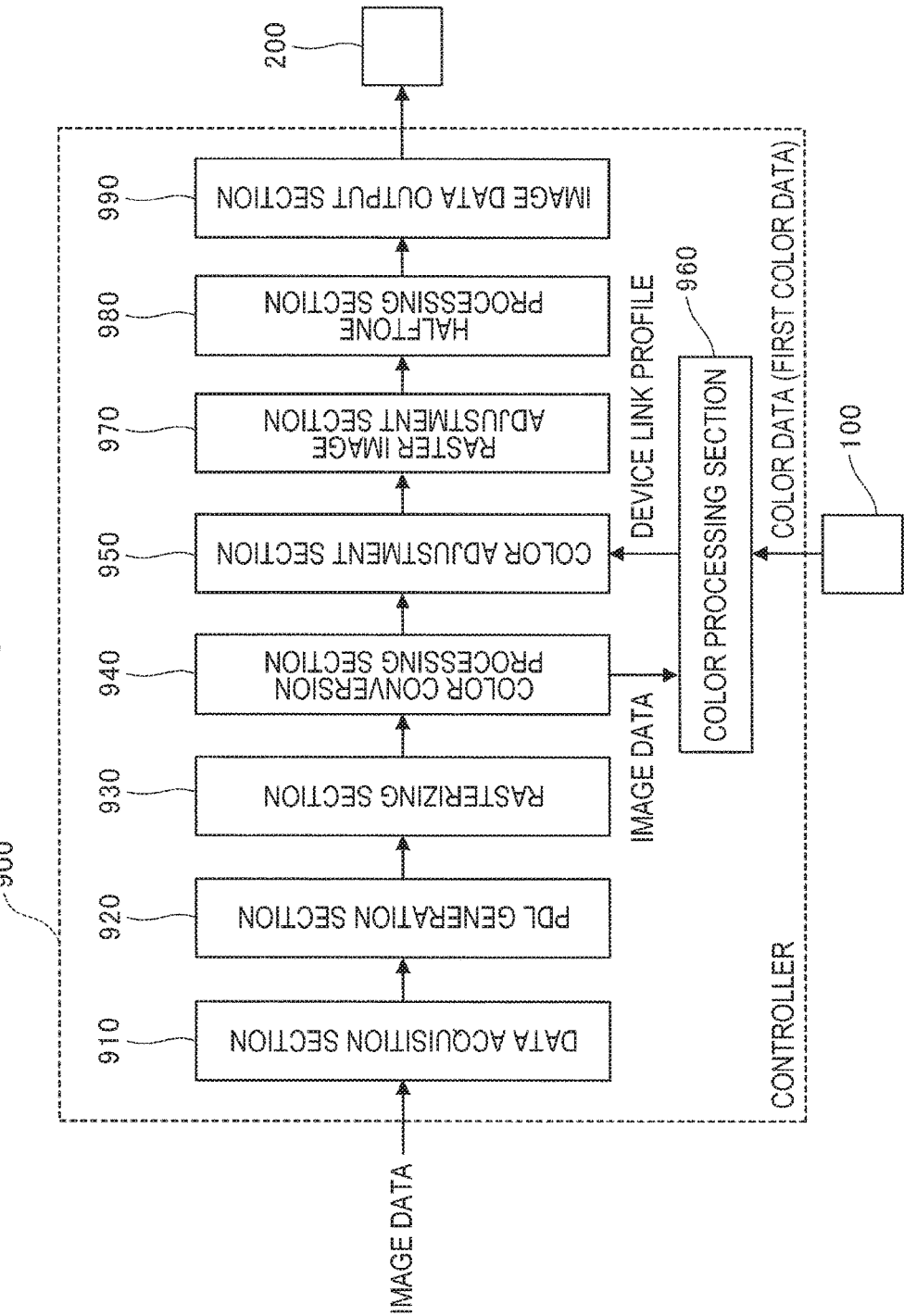
FIG. 4 is a block diagram illustrating a signal processing system in a controller.

FIG. 4 is a block diagram illustrating a signal processing system in the controller 900. Note that FIG. 4 illustrates functions related to signal processing that are selected from functions of the controller 900.

The controller 900 includes a data acquisition section 910, a page description language (PDL) generation section 920, a rasterizing section 930, a color conversion processing section 940, a color adjustment section 950, a color processing section 960, a raster image adjustment section 970, a halftone processing section 980, and an image data output section 990. The data acquisition section 910 acquires image data generated for outputting an image from the image recording device 200. The PDL generation section 920 receives the image data and converts the image data into a PDL. The rasterizing section 930 generates a raster image from the PDL generated by the PDL generation section 920.

The color conversion processing section 940 converts red, green, and blue (RGB) data into cyan, magenta, yellow, and black (CMYK) data. The color adjustment section 950 performs color adjustment on the CMYK data. The color processing section 960 generates a profile for the color adjustment section 950 to perform the color adjustment. The raster image adjustment section 970 adjusts the raster image converted by the color adjustment section 950. The halftone processing section 980 performs halftone processing. The image data output section 990 outputs the image data having undergone color conversion processing to the image recording device 200.

In the exemplary embodiment, the data acquisition section 910 first receives the image data. The image data is image data with which a user of a personal computer (PC) wishes to print the image by using the image forming apparatus 2.

The image data is transmitted to the PDL generation section 920. The PDL generation section 920 converts the image data into code data described in the PDL and outputs the image data.

The rasterizing section 930 converts the code data described in the PDL output from the PDL generation section 920 into raster data for each pixel and generates a raster image. The rasterizing section 930 outputs the converted raster data as video data (RGB data). At this time, the rasterizing section 930 outputs the RGB data on a per page basis.

The color conversion processing section 940 converts the RGB data input from the rasterizing section 930 into XYZ color values that are device-independent. The color conversion processing section 940 thereafter converts the XYZ color values into pieces of CMYK data that represent colors reproduced by the image recording device 200 (colors of toner as color materials that are cyan (C), magenta (M), yellow (Y), and black (K)) and outputs the pieces of CMYK data. The pieces of CMYK data are a piece of color C data, a piece of color M data, a piece of color Y data, and a piece of color K data that are separated on a per color basis.

The color adjustment section 950 performs the color adjustment on the image to be formed by the image recording device 200. The color adjustment section 950 performs the color adjustment on the CMYK data so as to make colors match desired colors to be output in accordance with the CMYK data by the image recording device 200. Note that in the image forming apparatus 2, the color adjustment section 950 is also used so as to perform the color adjustment for outputting an image having colors adjusted to match those of a printed material output by the image forming apparatus 1. This will be described later.

The color adjustment is a process for converting, for example, $C_{in}M_{in}Y_{in}K_{in}$ in data into $C_{out}M_{out}Y_{out}K_{out}$ data (pieces of data $C_{in}$, $M_{in}$, $Y_{in}$, and $K_{in}$ into pieces of data $C_{out}$, $M_{out}$, $Y_{out}$, and $K_{out}$). In the exemplary embodiment, the conversion is performed by using a so-called "device link profile" in which the $C_{in}M_{in}Y_{in}K_{in}$ data is directly converted into the $C_{out}M_{out}Y_{out}K_{out}$ data in the same CMYK color space as for the $C_{in}M_{in}Y_{in}K_{in}$ data. In the exemplary embodiment, the $C_{in}M_{in}Y_{in}K_{in}$ data is not converted into data in other color spaces such as an L*a*b* color space. The color adjustment section 950 stores the device link profile and applies the $C_{in}M_{in}Y_{in}K_{in}$ data to the device link profile to thereby perform the color adjustment.

In the exemplary embodiment, the color adjustment section 950 functions as a color adjustment device that performs color adjustment on an image to be formed by the image recording device 200 of the image forming apparatus 2. The device link profile is an example of a conversion relationship and may be generated as, for example, a four-dimensional look up table (LUT).

The color processing section 960 generates a device link profile for the color adjustment section 950 to perform the color adjustment. The color processing section 960 will be described in detail later. The color processing section 960 is an example of a color processing device. The color processing section 960 is also an example of a conversion relationship generation device that generates a conversion relationship (device link profile) used by the color adjustment section 950 for performing the color adjustment.

The raster image adjustment section 970 performs γ conversion, fineness processing, halftone processing, or the like on the $C_{out}M_{out}Y_{out}K_{out}$ data input from the color adjustment section 950 and performs various adjustments to obtain a better quality of an image output from the image recording device 200.

The halftone processing section 980 performs halftone processing on the image data by using dither mask processing that uses a dither mask having a predetermined threshold array in the main and sub-scan directions. The image data is thereby expressed with, for example, binary values, not multiple values.

The image data output section 990 outputs, to the image recording device 200, the image data having undergone the image processing such as the color conversion processing.

Color Processing Section

The color processing section 960 of the image forming apparatus 2 will be described in detail. A case where the color processing section 960 performs the color adjustment to output an image having colors adjusted to match the colors of a printed material output by the image forming apparatus 1 will be described.

The color processing section 960 generates a device link profile used for performing the color adjustment as described above.

Figure 5:
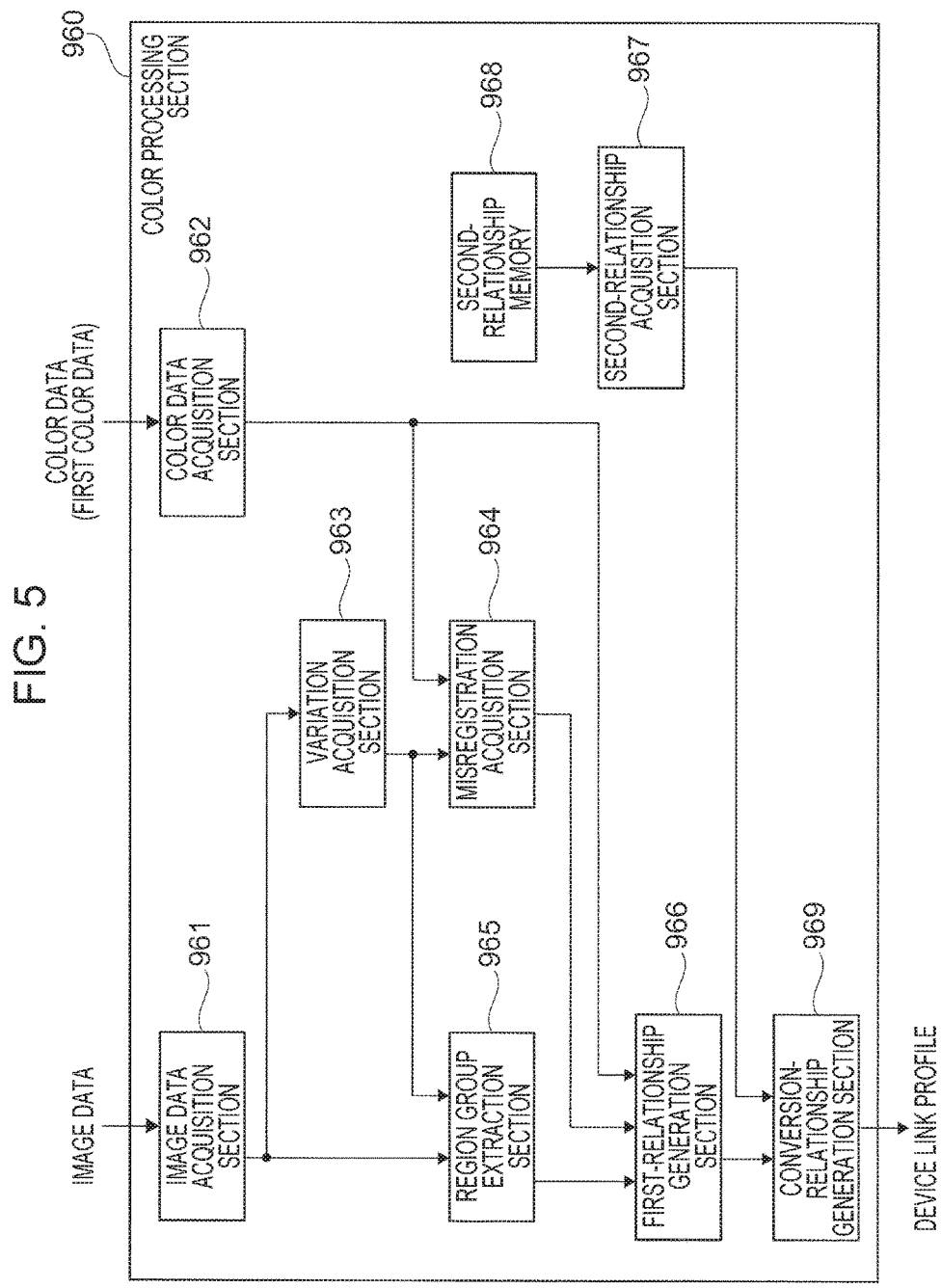
FIG. 5 is a block diagram for explaining the functional configuration of a color processing section.

FIG. 5 is a block diagram for explaining the functional configuration of the color processing section 960.

The color processing section 960 includes an image data acquisition section 961, a color data acquisition section 962, a variation acquisition section 963, a misregistration acquisition section 964, a region group extraction section 965, a first-relationship generation section 966, a second-relationship acquisition section 967, a second-relationship memory 968, and a conversion-relationship generation section 969.

The image data acquisition section 961 acquires the image data from the color conversion processing section 940. The image data is the CMYK data and is also raster data.

The color data acquisition section 962 acquires color data (first color data) regarding an image G1 (first image) output by the image recording device 200 of the image forming apparatus 1. To acquire the color data, for example, the printed material having the image G1 is read by using the image reading device 100 of the image forming apparatus 2. Specifically, the image reading section 110 of the image reading device 100 reads the colors of the printed material and generates the color data. Examples of usable color data include L*a*b* values as device-independent data. The L*a*b* values are defined using the L*a*b* color space (also referred to as a CIELAB color space). In addition, the L*a*b* color space is expressed using a Cartesian coordinate color space having axes of the lightness L* and chromaticities a* and b* indicating hue.

Note that the CCD provided to the image reading section 110 generally reads an image on the basis of RGB data; however, after the reading, the image reading section 110 may convert the RGB data into L*a*b* data by using a multi-dimensional table corresponding to the reading characteristics of the CCD and may thereby output color data having the L*a*b* values. The multi-dimensional table may use, for example, International Color Consortium (ICC) profiles generated in accordance with the reading characteristics of the CCD.

The variation acquisition section 963 calculates and acquires the degree of variation of the colors of the image data. How the variation acquisition section 963 acquires the degree of color variation of the image data will be described later.

The misregistration acquisition section 964 calculates and acquires amounts of misregistration between the image data and the color data (first color data) in regions exhibiting a high degree of color variation. When the color data (first color data) is read by the image reading section 110 as described above, misregistration may occur.

Figure 6B:
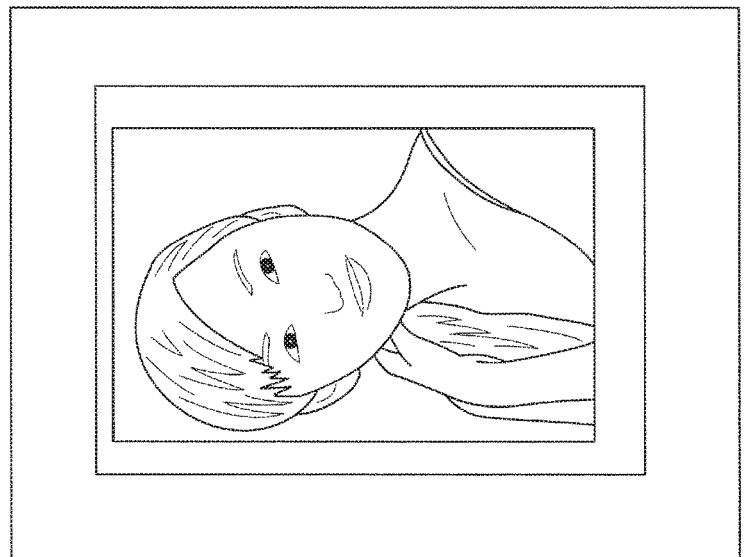
FIG. 6B illustrates an example in which misregistration has occurred between the image data and color data (first color data)
Figure 6A:
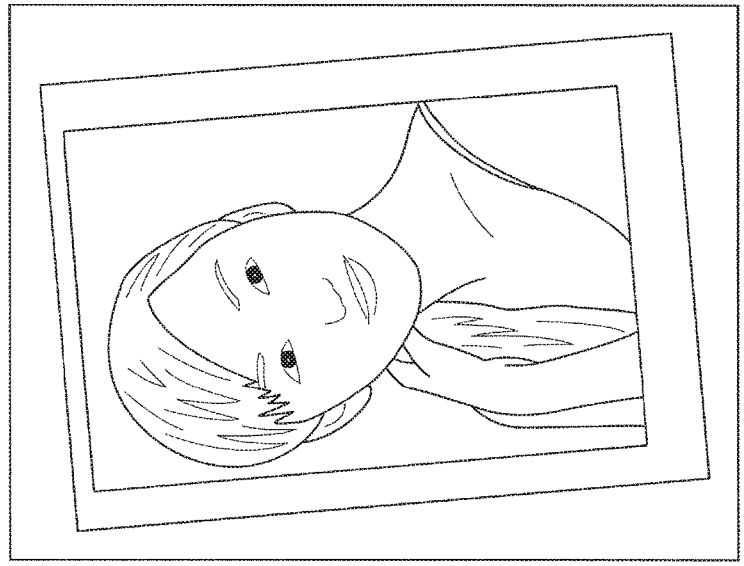
FIG. 6A illustrates image data.

FIG. 6A illustrates image data, and FIG. 6B illustrates an example in which misregistration has occurred between the image data and the color data (first color data).

In this case, horizontal and vertical shifting (parallel translation), enlargement/reduction, and rotation with respect to the image data have occurred in the color data (first color data). The misregistration acquisition section 964 acquires amounts of misregistration. A method for acquiring amounts of misregistration will be described later.

The region group extraction section 965 extracts regions exhibiting a low degree of color variation as a region group in the image data. The region group is composed of extracted regions that are set to know a color difference between printed materials respectively output by the image forming apparatus 2 and the image forming apparatus 1. The color difference is acquired to adjust the colors of the printed material to be output by the image forming apparatus 2 to match those output by the image forming apparatus 1. The region group extraction section 965 extracts the region group from the raster data acquired by the image data acquisition section 961.

The region group extraction section 965 also generates, as region-group information, information regarding the extracted region group. The region-group information includes information used for identifying the extracted regions in the region group. For example, the color-region-group information includes location information or image information regarding each extracted region. The color-region-group information will be described in detail later.

The first-relationship generation section 966 performs registration by correcting the misregistration and thereafter generates a first relationship between the image data and the color data (first color data) acquired by the color data acquisition section 962 in the regions exhibiting a low degree of color variation.

The first relationship is a relationship (CMYK-$L^*_1 a^*_1 b^*_1$) between the CMYK data that is the image data and the L*a*b* data that is the color data (first color data) (hereinafter, the first color data is also referred to as "$L^*_1 a^*_1 b^*_1$ data"). A method for generating a first relationship will be described in detail later.

The second-relationship acquisition section 967 acquires a second relationship that, for the image recording device 200 of the image forming apparatus 2, corresponds to the first relationship between the image data and the color data acquired from the image forming apparatus 2.

The second relationship is a relationship (CMYK-$L^*_2 a^*_2 b^*_2$) between the CMYK data and the L*a*b* data that is the color data (second color data) (hereinafter, the second color data is also referred to as "$L^*_2 a^*_2 b^*_2$ data"). The second relationship has been stored in the second-relationship memory 968, and the second-relationship acquisition section 967 acquires the second relationship from the second-relationship memory 968.

The second relationship is generated in advance and stored in the second-relationship memory 968. To generate a second relationship, a method in the related art may be used. For example, an image of color patches covering the full color gamut of the image recording device 200 of the image forming apparatus 2 is printed. The colors of the printed image are subsequently measured by using a colorimeter or other devices, and color data is acquired. The color data thus acquired is the second color data ($L^*_2 a^*_2 b^*_2$ data). The image data for printing the image of the color patches is correlated with the second color data, and the second relationship is thereby acquired.

The conversion-relationship generation section 969 generates, on the basis of the first and second relationships, a conversion relationship for performing color adjustment on an image G2 (second image) to be output from the image recording device 200 of the image forming apparatus 2 to make the colors of the image G2 match the colors of the image G1 (first image).

Specifically, the L*a*b* data ($L^*_1 a^*_1 b^*_1$ data) in the first relationship is compared with the L*a*b* data ($L^*_2 a^*_2 b^*_2$ data) in the second relationship. A relationship in the CMYK data between the first and second relationships at the time when the $L^*_1 a^*_1 b^*_1$ data and the $L^*_2 a^*_2 b^*_2$ data match is generated. Specifically, the first relationship represents a relationship between the CMYK data that is the image data and the colors of the image G1 printed by the image forming apparatus 1 when the CMYK data is input. The second relationship represents a relationship between the CMYK data and the colors of the image G2 printed by the image forming apparatus 2 when the CMYK data is input. Even if the same CMYK data is input, the image G1 and the image G2 do not have the same colors because the apparatuses have different characteristics. In contrast, the conversion relationship represents the relationship of the CMYK data of the same colors between the images respectively printed by the image forming apparatuses 1 and 2. Hence, the CMYK data that is the image data is converted by using the conversion relationship, and the image forming apparatus 2 prints an image by using the converted CMYK data. The image forming apparatus 2 naturally prints the image G2 having the same colors as those of the image G1 printed by the image forming apparatus 1. The use of the conversion relationship enables the color adjustment through which the image forming apparatus 2 prints a printed material in such a manner that the colors of the printed material are adjusted to match the colors of the printed material output from the image forming apparatus 1. The conversion relationship is included in the four-dimensional LUT and is the device link profile, as described above.

Variation Acquisition Section

Figure 7:
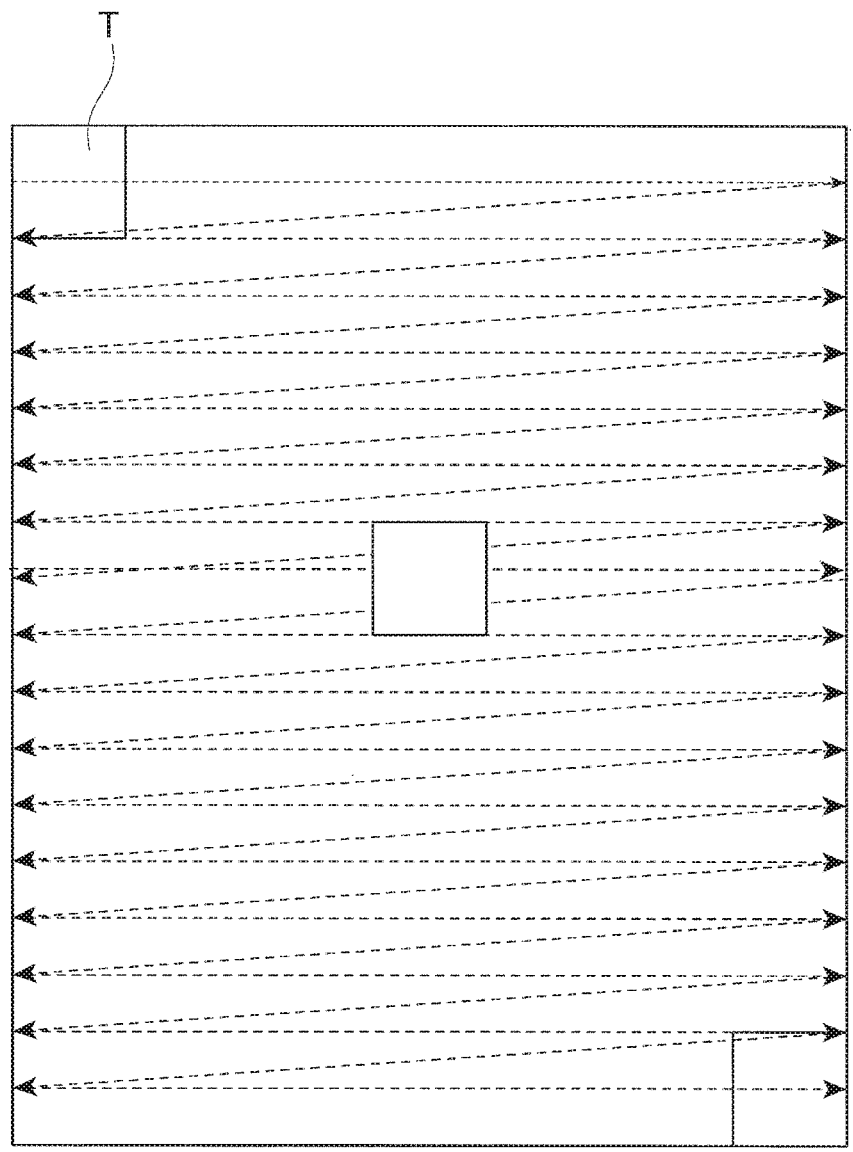
FIG. 7 is a diagram illustrating how a raster image is scanned by using a scan rectangle.

The variation acquisition section 963 first converts the CMYK data that is the image data acquired by the image data acquisition section 961 into L*a*b* data. The image data resulting from the conversion is the L*a*b* data and is also raster data. The variation acquisition section 963 then sets scan rectangles T each having a predetermined size as illustrated in FIG. 7 and scans the raster image by using the scan rectangles T.

The variation acquisition section 963 then obtains the variance of pixels in each scan rectangle T. The variance may be defined in the following manner. Each of pixel values of the corresponding pixel in each scan rectangle T is $(L_0^*, a_0^*, b_0^*)$, and the mean pixel value of all of the pixels in the scan rectangle T is $(L_{ave}^*, a_{ave}^*, b_{ave}^*)$. The variation acquisition section 963 uses values that are each $(L_0^*-L_{ave}^*)^2+(a_0^*-a_{ave}^*)^2+(b_0^*-b_{ave}^*)^2$ for the respective pixels. The variation acquisition section 963 defines the variance as the summation of the values of all of the pixels in the scan rectangle T. That is, the variance is obtained in accordance with Formula 1 as below.

$$(\text{Variance})=\Sigma\{(L_0^*-L_{ave}^*)^2+(a_0^*-a_{ave}^*)^2+(b_0^*-b_{ave}^*)^2\}$$

The variation acquisition section 963 calculates the variance as the degree of variation.

Misregistration Acquisition Section

The misregistration acquisition section 964 extracts regions exhibiting a high degree of color variation on the basis of the variance calculated by the variation acquisition section 963. Specifically, the misregistration acquisition section 964 extracts the scan rectangles T having a variance exceeding a predetermined threshold.

Figures 8A, 8B:
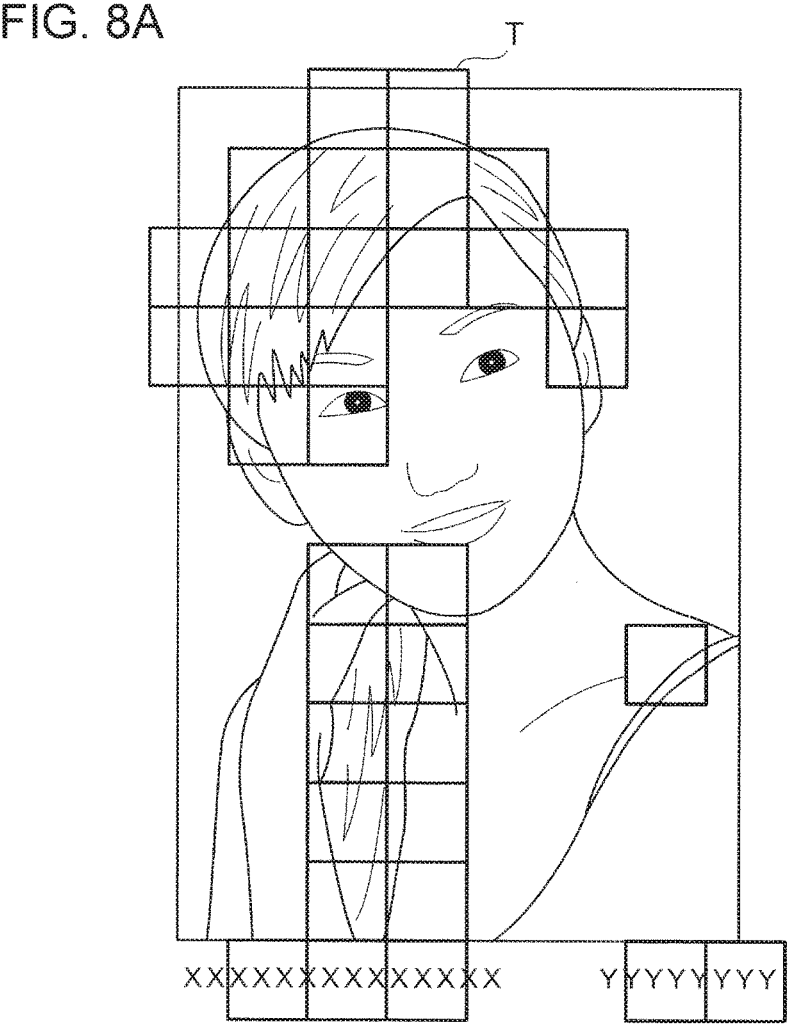
FIGS. 8A and 8B illustrate a result of extraction performed by a misregistration acquisition section on regions exhibiting a high degree of color variation.

FIGS. 8A and 8B illustrate a result of extraction performed by the misregistration acquisition section 964 on regions exhibiting a high degree of color variation.

FIG. 8A illustrates an example of the image G1 (first image) formed based on the image data. Rectangles in the image G1 are the scan rectangles T extracted by the misregistration acquisition section 964, that is, the scan rectangles T having a variance exceeding the predetermined threshold. FIG. 8B illustrates variance values of the extracted scan rectangles T. The threshold is herein set to 300, and a region having a variance exceeding 300 is determined as a region exhibiting a high degree of color variation. Examples of the region exhibiting a high degree of color variation include an edge portion. From the image G1 in FIG. 8A, the scan rectangles T that are located on a boundary between a person and the background and located on a boundary between the hair of the person and the skin are extracted.

There may be a case where the regions exhibiting a high degree of color variation exceeding the threshold thus set is not found. In this case, the threshold is changed to a smaller value, and regions exhibiting a high degree of color variation are extracted again. Preprocessing for enhancing the contrast between the image data and the color data (first color data) may also be performed, and thereafter regions exhibiting a high degree of color variation may be extracted.

The misregistration acquisition section 964 performs template matching on the extracted scan rectangles T and acquires amounts of misregistration between the image data and the color data (first color data).

FIG. 9A is a diagram for explaining the template matching.

FIG. 9A conceptually illustrates one of the scan rectangles T in the image data and a rectangular region U located at the position corresponding to the scan rectangle T in the color data (first color data).

The pixel value of each pixel in the scan rectangle T in the image data in FIG. 9A is $(L_0^*, a_0^*, b_0^*)$. The pixel value of each pixel in the rectangular region U at the corresponding position in the color data (first color data) is $(L^*, a^*, b^*)$.

The misregistration acquisition section 964 uses values that are each $(L^*-L_0^*)+(a^*-a_0^*)+(b^*-b_0^*)$ for the respective pixels in the scan rectangle T. The misregistration acquisition section 964 calculates, as a value of the summation of the values of all of the pixels in the scan rectangle T, a difference e defined in accordance with Formula 2 below.

$$e=\Sigma\{(L^*-L_0^*)+(a^*-a_0^*)+(b^*-b_0^*)\}$$

The misregistration acquisition section 964 horizontally and vertically shifts the rectangular region U in the color data (first color data) and obtains an amount of shift leading to the smallest difference e. The amount of shift leading to the smallest difference e may be regarded as an amount of misregistration between the image data and the color data (first color data) at the position where the amount of shift leading to the smallest difference e is obtained. The amount of misregistration is herein also calculated as an amount of parallel translation. An amount of parallel translation in the main scan direction is herein $\Delta x$, and an amount of parallel translation in the sub-scan direction is herein $\Delta y$. If a pixel located at a position (x,y) in the scan rectangle T corresponds to a pixel located at a position (u,v) in the rectangular region U, expressions of $\Delta x=x-u$ and $\Delta y=y-v$ may be used.

FIG. 9B is a table illustrating $\Delta x$ in the scan rectangles T extracted by the misregistration acquisition section 964. FIG. 9C is a table illustrating $\Delta y$ in the scan rectangles T extracted by the misregistration acquisition section 964.

The misregistration acquisition section 964 excludes, from $\Delta x$ and $\Delta y$ illustrated in FIGS. 9B and 9C, $\Delta x$ and $\Delta y$ having a large error.

Figure 10A:
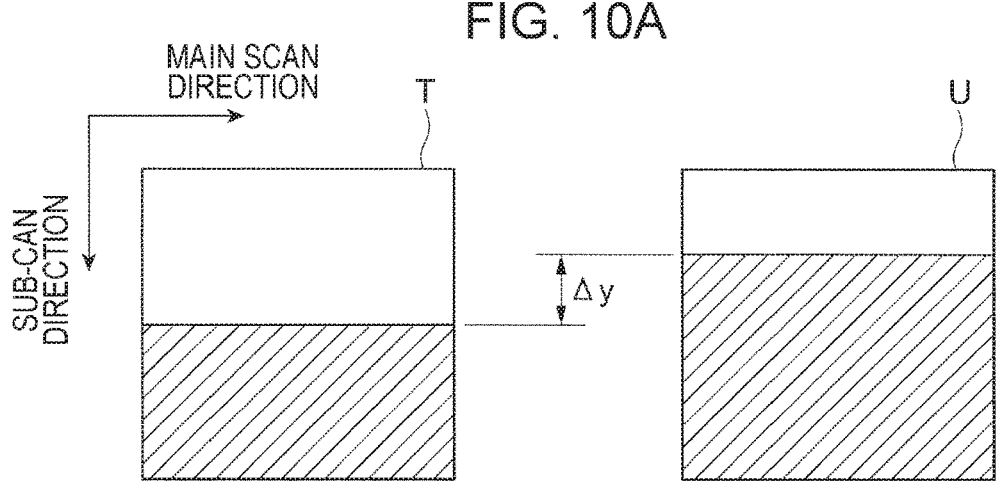
FIG. 10A is a diagram illustrating an image having $\Delta x$ that is prone to having a large error.
Figure 10B:
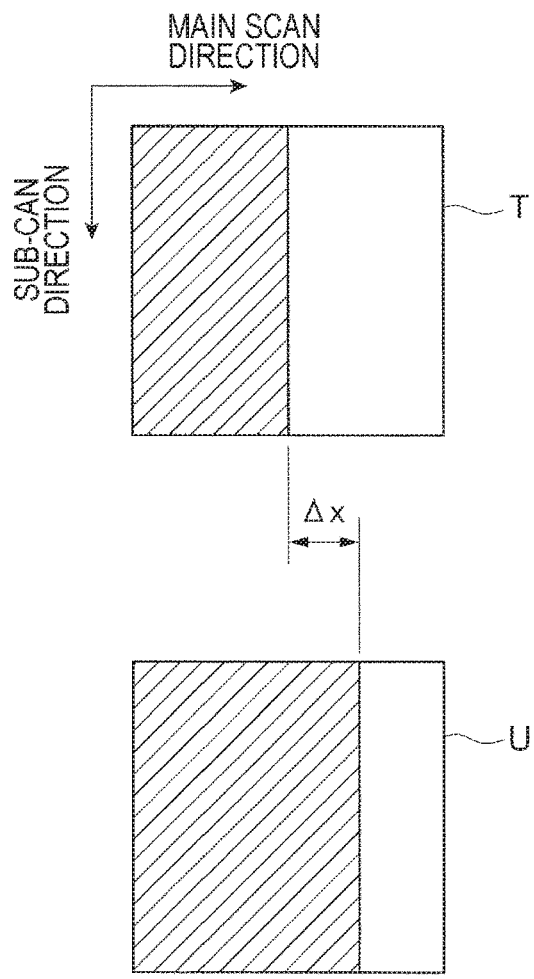
FIG. 10B is a diagram illustrating an image having $\Delta y$ that is prone to having a large error.

FIG. 10A is a diagram illustrating an image having $\Delta x$ that is prone to having a large error. FIG. 10B is a diagram illustrating an image having $\Delta y$ is prone to having a large error.

Each of the images in FIGS. 10A and 10B includes an edge portion included in the scan rectangle T and the rectangular region U. In FIG. 10A, an amount of parallel translation $\Delta y$ in the sub-scan direction is prone to having a small error. In contrast, an amount of parallel translation $\Delta x$ in the main scan direction is prone to having a large error because there is a slight change from the original image despite the shifting of the rectangular region U. In FIG. 10B, an amount of parallel translation $\Delta x$ in the main scan direction is prone to having a small error. In contrast, an amount of parallel translation $\Delta y$ in the sub-scan direction is prone to having a large error because there is a slight change from the original image despite the shifting of the rectangular region U.

Hence, the misregistration acquisition section 964 uses, for example, the following method to exclude $\Delta x$ and $\Delta y$ that have a large error.

The misregistration acquisition section 964 generates a histogram for $\Delta x$ and $\Delta y$.

FIG. 11 is a histogram generated for $\Delta x$ and $\Delta y$. In FIG. 11, the horizontal axis represents values of $\Delta x$ and $\Delta y$, and the vertical axis represents frequency.

As illustrated in FIG. 11, $\Delta x$ and $\Delta y$ have peaks Px and Py that are located between the highest dotted line and the second lowest dotted line in the histogram. Most $\Delta x$ and $\Delta y$ are located between the dotted lines, but $\Delta x$ and $\Delta y$ outside the range are considered to have a large error and are thus excluded. In the example illustrated in FIG. 11, $\Delta y$ having values of −19, −3, and 7 illustrated by the arrows are excluded. That is, $\Delta x$ and $\Delta y$ are amounts of misregistration in the main scan direction and the sub-scan direction observed when the image reading section 110 reads the image G1, and $\Delta x$ and $\Delta y$ do not vary largely in the image G1 as a whole. When being generated for $\Delta x$ and $\Delta y$, a histogram thus has the peaks Px and Py. Accordingly, $\Delta x$ and Δy outside the range including the peaks Px and Py may be considered to have a large error.

The misregistration acquisition section 964 further obtains affine transformation coefficients by using Δx and Δy within the range of the peaks Px and Py.

The affine transformation coefficients are coefficients a, b, c, d, e, and f defined in accordance with Formula 3 below. In this case, it may be said that the misregistration acquisition section 964 calculates the affine transformation coefficients by using the summation of the amounts of parallel translation excluding abnormal values among the amounts of parallel translation of a region exhibiting a high degree of color variation.

$$\begin{bmatrix} a \\ b \\ c \end{bmatrix} = \begin{bmatrix} \sum x^2 & \sum xy & \sum x \\ \sum xy & \sum y^2 & \sum y \\ \sum x & \sum y & \sum 1 \end{bmatrix}^{-1} \begin{bmatrix} \sum ux \\ \sum uy \\ \sum u \end{bmatrix}$$

$$\begin{bmatrix} d \\ e \\ f \end{bmatrix} = \begin{bmatrix} \sum x^2 & \sum xy & \sum x \\ \sum xy & \sum y^2 & \sum y \\ \sum x & \sum y & \sum 1 \end{bmatrix}^{-1} \begin{bmatrix} \sum vx \\ \sum vy \\ \sum v \end{bmatrix}$$

$$\begin{cases} u = ax + by + c \\ v = dx + ey + f \end{cases}$$

Formula 3 reveals a relationship between a pixel located at (x,y) in the image data and a pixel located at (u,v) in the color data (first color data). In this case, the pixel located at (u,v) in the color data (first color data) corresponds to the pixel located at (x,y) in the image data. When the misregistration is corrected, the locations of the pixels match. Formula 3 also reveals a relationship between a region outside the scan rectangle T and a region outside the rectangular region U.

That is, the misregistration acquisition section 964 may estimate amounts of misregistration between the image data and the color data (first color data) in a region exhibiting a low degree of color variation on the basis of amounts of misregistration between the image data and the color data (first color data) in a region exhibiting a high degree of color variation.

The use of the affine transformation coefficients enables estimation of amounts of parallel translation, the ratio of enlargement/reduction, and the angle of rotation between the image data and the color data (first color data). These may be obtained on the basis of Δx and Δy described above that are the amounts of parallel translation. In other words, the misregistration acquisition section 964 may estimate the amounts of parallel translation, the ratio of enlargement/reduction, and the angle of rotation between the image data and the color data (first color data) in a region exhibiting a low degree of color variation on the basis of the amounts of parallel translation between the image data and the color data (first color data) in a region exhibiting a high degree of color variation.

Note that if the region exhibiting a high degree of color variation is located close to the region exhibiting a low degree of color variation at this time, the accuracy of the estimated amounts of misregistration is improved.

Region-group Information

The region-group information generated by the region group extraction section 965 will be described.

The extracted regions constituting the region group are regions of which colors are substantially uniform (hereinafter, referred to as uniform-color regions). Regions having substantially the same color signal in such uniform-color regions are selected as the extracted regions. In other words, regions exhibiting a low degree of color variation are extracted. As long as uniform-color regions have substantially the same color signal, the size of the entire uniform-color regions may vary.

Figure 12B:
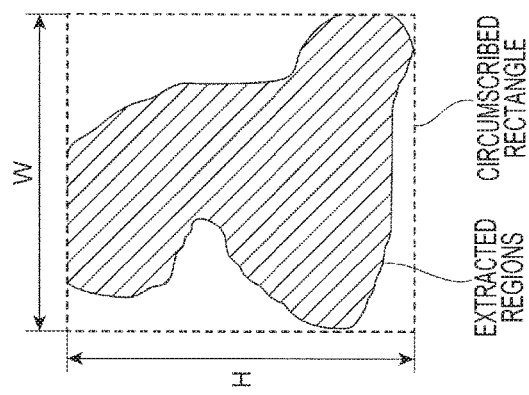
FIGS. 12A and 12B are histograms and a graph illustrating a method for generating a region group.
Figure 12A:
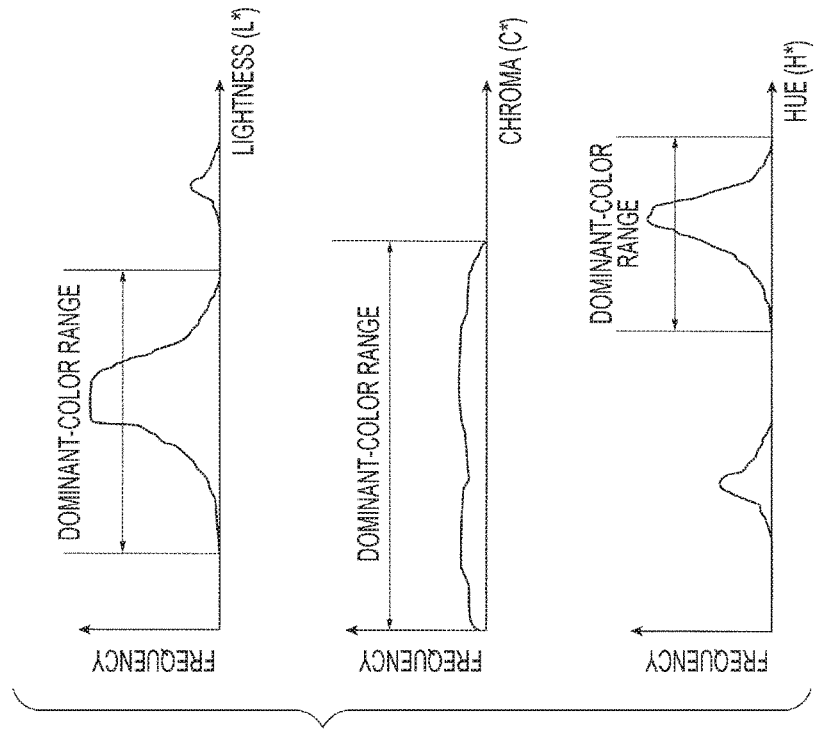

FIGS. 12A and 12B are histograms and a graph illustrating a method for generating a region group.

The region group extraction section 965 generates histograms of the pixel values included in each scan rectangle T described above.

FIG. 12A illustrates examples of the histograms of one of the scan rectangles T.

FIG. 12A illustrates a case where CMYK values in a raster image are converted into color values in an L*C*H* color space in which colors are represented using lightness, chroma, and hue and where histograms for lightness (L*), chroma (C*), and hue (H*) are generated. The horizontal axes respectively represent lightness (L*), chroma (C*), and hue (H*), and the vertical axes each represent the number of pixels as frequency.

A range having the highest frequency peak in each histogram is determined as a dominant-color range. FIG. 12A illustrates the ranges each having the highest frequency peak as the dominant-color ranges. A region included in the dominant-color range in the scan rectangle T is referred to as a dominant-color region. If a percentage of the area (the number of pixels) of the dominant-color region relative to the area (the number of pixels) of the scan rectangle T is equal to or higher than a predetermined threshold, and if color variance of the pixels in the dominant-color region is equal to or lower than a predetermined threshold, the scan rectangle T is selected as an extracted region. The dominant-color region of an adjacent scan rectangle T is also checked. If the colors in the dominant-color regions are identical, the scan rectangles T are coupled together. The processing is repeated for the scan rectangles T arranged in succession, and such scan rectangles T are grouped as a larger unit than a scan rectangle T. The dominant-color regions thus grouped are set as extracted regions. The extracted regions have an amorphous outline as illustrated, for example, in FIG. 12B.

A predetermined threshold for the height of a peak in FIG. 12A may be provided. If the height of a peak is lower than the threshold, it is desirable not to determine a range including the peak as the dominant-color range and not select the scan rectangle including the region as the extracted region.

The region group extraction section 965 generates the region-group information. The region-group information includes the location information regarding the extracted regions. The location information includes, for example, an X upper-left-corner-of-circumscribed-rectangle coordinate, a Y upper-left-corner-of-circumscribed-rectangle coordinate, a circumscribed-rectangle width, a circumscribed-rectangle height, and bitmap information.

The X and Y upper-left-corner-of-circumscribed-rectangle coordinates are respectively the X and Y coordinates of the upper left corner of the rectangle indicated by a dotted line including the extracted regions as illustrated in FIG. 12B. The circumscribed-rectangle width is a width W of the circumscribed rectangle, and the circumscribed-rectangle height is a height H of the circumscribed rectangle. According to the information, the location of the circumscribed rectangle is identifiable.

The bitmap information is binary image information having values of 1 indicating pixels belonging to the extracted regions in the circumscribed rectangle and 0 indicating the other pixels. In this case, areas indicated by 1 in the binary image are the extracted regions, and areas indicated by 0 are the other regions. The location of each extracted region in the circumscribed rectangle is thus identifiable.

The region-group information also includes information regarding the minimum values ($L^*_{max}$, $C^*_{max}$, and $H^*_{max}$) and the maximum values ($L^*_{max}$, $C^*_{max}$, and $H^*_{max}$) of the lightness (L*), the chroma (C*), and the hue (H*) of the dominant-color region. The range of the colors in the extracted region is thereby identifiable.

Method for Generating First Relationship

How the first-relationship generation section 966 generates the first relationship will be described. The first relationship is herein generated in two steps of Step 1 and Step 2.

FIG. 13 is a diagram for explaining Step 1 in which the first-relationship generation section 966 generates a first relationship.

First, Part (a) of FIG. 13 illustrates CMYK data that is the image data. The CMYK data is converted into L*C*H* data illustrated in Part (b) of FIG. 13. The region-group information illustrated in Part (c) of FIG. 13 is subsequently referred to, and the L*C*H* data regarding pixels in each extracted region is extracted as illustrated in Part (d) of FIG. 13. This is performed in such a manner that the location of each extracted region is first identified according to the location information included in the region-group information and that the extracted region is further identified on the basis of the minimum values ($L^*_{min}$, $C^*_{min}$, and $H^*_{min}$) and the maximum values ($L^*_{max}$, $C^*_{max}$, and $H^*_{max}$) of the L*, C*, and H* values in the extracted region.

The L*C*H* data of each pixel in the extracted region is subsequently restored to the CMYK data as illustrated in Part (e) of FIG. 13. Further, the pieces of CMYK data of the respective pixels in the extracted region are averaged, and the average is used as the CMYK data of each extracted region illustrated in Part (f) of FIG. 13.

In contrast, Part (g) of FIG. 13 illustrates the $L^*_1 a^*_1 b^*_1$ data that is color data (first color data). The processing in Parts (h) to (j) of FIG. 13 is performed in the same manner as in Parts (b) to (d) of FIG. 13. The L*C*H* data of each pixel in the extracted region is subsequently restored to the $L^*_1 a^*_1 b^*_1$ data as illustrated in Part (k) of FIG. 13. Further, the pieces of $L^*_1 a^*_1 b^*_1$ data of the respective pixels in the extracted region are averaged, and the average is used as the $L^*_1 a^*_1 b^*_1$ data of each extracted region illustrated in Part (l) of FIG. 13.

Subsequently, the CMYK data of each extracted region illustrated in Part (f) of FIG. 13 and the $L^*_1 a^*_1 b^*_1$ data of each region in the region group illustrated in Part (l) of FIG. 13 are correlated with each other.

Nevertheless, colors in image data do not generally cover the full color gamut of the image forming apparatus 1. Accordingly, Step 1 generally results in a small number of first relationships (CMYK-$L^*_1 a^*_1 b^*_1$), and the number of first relationships to generate a high accuracy conversion relationship is not satisfied in many cases. Hence, processing for covering the shortage is performed in Step 2.

FIGS. 14A, 14B, 14C, and 14D are diagrams for explaining Step 2 in the generation of first relationships performed by the first-relationship generation section 966.

The first-relationship generation section 966 applies the image data and the acquired color data (first color data) to first relationship candidates prepared in advance in a wider color gamut than the color gamut of pieces of color data (first color data) and subsequently performs matching on the image data and the acquired color data with a corresponding one of the first relationship candidates.

Figure 14A:
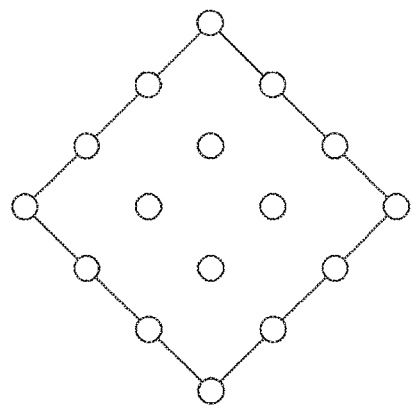
FIGS. 14A, 14B, 14C, and 14D are diagrams for explaining Step 2 in which the first-relationship generation section generates the first relationship.

FIG. 14A is a conceptual diagram illustrating the first relationship candidates prepared in advance.

FIG. 14A illustrates the first relationship (CMYK-$L^*_1 a^*_1 b^*_1$) candidates prepared in advance in the full color gamut (a rhombic area) of the image forming apparatus 1.

Figure 14B:
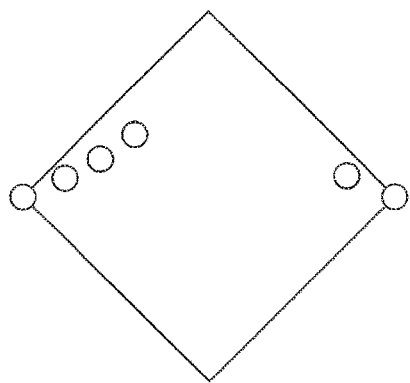

FIG. 14B illustrates the first relationships (CMYK-$L^*_1 a^*_1 b^*_1$) acquired in Step 1. In this case, the first relationships respectively have six pieces of data.

Figure 14C:
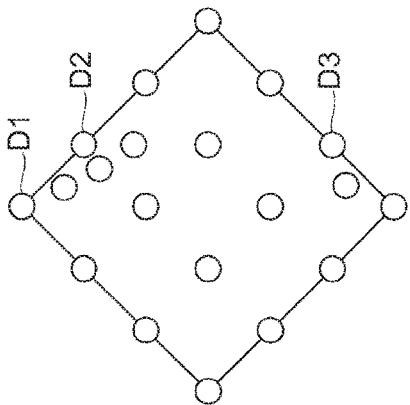

In the exemplary embodiment, the pieces of image data and acquired color data (first color data) in FIG. 14B are applied to the first relationship candidates in FIG. 14A and are then synthesized, as illustrated in FIG. 14C.

The pieces of data in FIG. 14A, however, do not match the pieces of data in FIG. 14B, and not only application but also matching is thus performed. For example, one or more pieces of data in FIG. 14A in a Euclidean distance shorter than a predetermined Euclidean distance from a corresponding one of the pieces of data in FIG. 14B are removed. Alternatively, a weighting is set on the basis of a Euclidean distance from each piece of data in FIG. 14B to the corresponding piece of data in FIG. 14A, and the pieces of data in FIG. 14B are weighted.

Figure 14D:
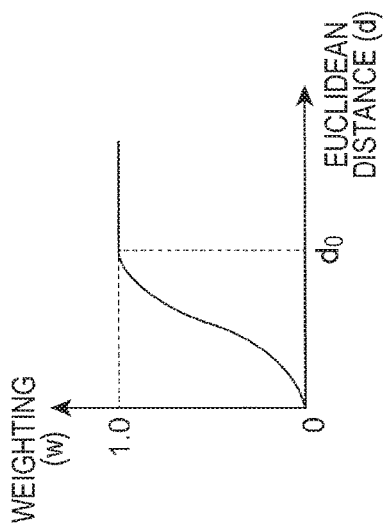

FIG. 14D is a graph illustrating a weighting w set as a Euclidean distance d.

In FIG. 14D, the horizontal axis represents the Euclidean distance d, the vertical axis represents the weighting w, and a relation $w=1/(1+d)$ is set.

In this case, the weighting w thus set is decreased as the Euclidean distance d from the corresponding piece of distance in FIG. 14B is decreased. For example, in a case where the Euclidean distance d is 0, the weighting w is 0. This case is equivalent to a case where the corresponding piece of data in FIG. 14A does not exist. The weighting w thus set is increased as the Euclidean distance d from the corresponding piece of distance in FIG. 14B is increased. If the Euclidean distance d is longer than a predetermined Euclidean distance $d_0$, the weighting w is 1. The case where the weighting w is 1 is equivalent to a case where the corresponding piece of data is weighted with no weighting w.

FIG. 14C illustrates locations D1, D2, and D3 of the pieces of data in FIG. 14A that are to be removed or weighted.

In this manner, the first-relationship generation section 966 covers the shortage of the first relationships in Step 1 and generates final first relationships (CMYK-$L^*_1 a^*_1 b^*_1$).

Note that colors in the image data in the first relationships (CMYK-$L^*_1 a^*_1 b^*_1$) acquired in Step 1 might cover the full color gamut of the image forming apparatus 1. In this case, there is no need to perform the processing in Step 2 described above. The first-relationship generation section 966 may thus be provided with a judgment section that judges the necessity of the processing in Step 2, and whether to perform the processing in Step 2 may be judged in accordance with a result of the judgment performed by the judgment section. To judge this, for example, the color gamut of the image forming apparatus 1 is divided into regions, and frequency distribution indicating how many pieces of data in FIG. 14B are included in each region is calculated. A judgment is made on the basis of whether a region exhibiting a low frequency is present.

The first relationship candidates illustrated in FIG. 14A are desirably close to the first relationships acquired in Step 1 in FIG. 14B. A large discrepancy therebetween causes deterioration of color reproduction accuracy or continuity near boundaries between the first relationship candidates and the first relationships even though the aforementioned matching is performed.

Hence, multiple first relationship candidates may be prepared in advance for each first relationship acquired in Step 1, and one of the candidates may be selected as the first relationship candidate for the first relationship. In other words, one of the first relationship candidates that is closest to the first relationship acquired in Step 1 is selected. In this case, the first-relationship generation section 966 may be provided with, for example, a setting section that selects one of the first relationship candidates and sets the first relationship candidate.

For example, if it is known that the image G1 has been output under the condition close to Japan Color 2011, a first relationship candidate using the Japan Color 2011 condition may be included in the multiple first relationship candidates. A first relationship candidate using a standard and frequently used condition may also be included. A first relationship candidate having a typical condition used for image forming apparatuses sold in the past may also be included. A larger number of first relationship candidates may also be automatically generated.

Color Adjustment Performed by Image Forming Apparatus 2

Subsequently, how the image forming apparatus 2 performs color adjustment for outputting an image G2 having colors adjusted to match those of the image forming apparatus 1 will be described.

Figure 15:
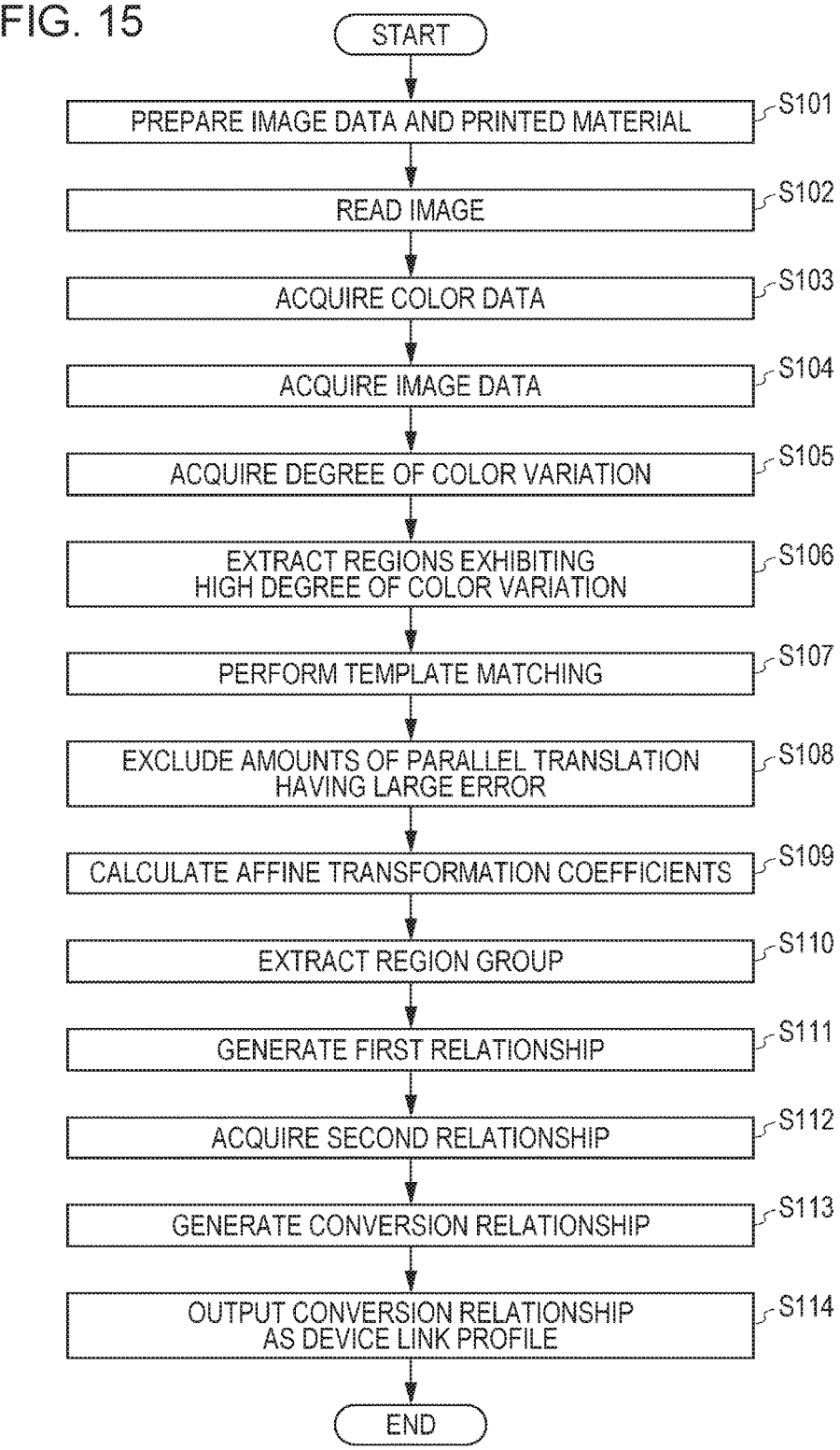
FIG. 15 is a flowchart for explaining how the image forming apparatus performs color adjustment for outputting an image having colors adjusted to match colors of another image forming apparatus.

FIG. 15 is a flowchart for explaining how the image forming apparatus 2 performs the color adjustment for outputting the image G2 having colors adjusted to match colors of the image forming apparatus 1.

Hereinafter, description is given by using FIGS. 5 and 15.

First, a printed material on which an image G1 output by the image forming apparatus 1 is printed and image data used for printing the printed material are prepared (step 101).

The image reading device 100 of the image forming apparatus 2 subsequently reads the image G1 (step 102).

The color data (first color data) of the image G1 read by the image reading device 100 is transmitted to the color processing section 960 of the controller 900, and the color data acquisition section 962 of the controller 900 acquires the color data (first color data) (S103).

The image data acquisition section 961 of the color processing section 960 acquires the image data from the color conversion processing section 940 (S104).

The variation acquisition section 963 calculates the degree of variation of the colors of the image data (S105). The variation acquisition section 963 sets the scan rectangles T, for example, of the predetermined size and calculates the degree of variation of the pixels in each scan rectangle T by obtaining the variance in accordance with Formula 1.

The misregistration acquisition section 964 extracts regions exhibiting a high degree of color variation on the basis of the variance calculated by the variation acquisition section 963 (S106). In this case, the misregistration acquisition section 964 extracts the scan rectangles T having a variance exceeding the predetermined threshold.

The misregistration acquisition section 964 performs the template matching between the scan rectangles T and the rectangular regions U and obtains amounts of misregistration between the image data and the color data (first color data) (S107). Specifically, the misregistration acquisition section 964 uses Formula 2 to obtain amounts of parallel translation $\Delta x$ in the main scan direction and amounts of parallel translation $\Delta y$ in the sub-scan direction each of which is observed when the difference e is the smallest.

The misregistration acquisition section 964 further generates a histogram for the amounts of parallel translation $\Delta x$ and $\Delta y$ and excludes, on the basis of the histogram, the amounts of parallel translation $\Delta x$ and $\Delta y$ having a large error (S108).

The misregistration acquisition section 964 calculates the affine transformation coefficients in accordance with Formula 3 (S109). Accordingly, amounts of misregistration in the entire image may be known.

The region group extraction section 965 extracts, as a region group, regions exhibiting a low degree of color variation (S110). To extract the region group, for example, the method described with reference to FIGS. 12A and 12B is used.

The first-relationship generation section 966 generates a first relationship that is a relationship between the image data and the color data (first color data) acquired by the color data acquisition section 962 (S111). To generate the first relationship, for example, the method described with reference to FIGS. 13 to 14D is used. At this time, the first-relationship generation section 966 performs registration by correcting the misregistration and generates a first relationship.

The second-relationship acquisition section 967 acquires a second relationship stored in the second-relationship memory 968 (S112).

The conversion-relationship generation section 969 generates, on the basis of the first and second relationships, a conversion relationship for the image recording device 200 of the image forming apparatus 2 to perform color adjustment (S113).

The conversion relationship is output as a device link profile to the color adjustment section 950 (S114).

The color adjustment section 950 performs conversion on the image data by using the device link profile so as to adjust the colors of the image G2 to match the colors of the image G1. The colors of the image G2 to be output by the image forming apparatus 2 thereby match the colors of the image G1 output by the image forming apparatus 1.

The image reading device 100 is incorporated in the image forming apparatus 2 in the example described above in detail but may be separately provided as an independent apparatus.

Likewise, the controller 900 is incorporated in the image forming apparatus 2, but the function of the color processing section 960 of the controller 900 may be independently provided. Operations of the function may be performed by, for example, a PC, a tablet terminal, a smartphone, or other apparatuses. In this case, the function of the color processing section 960 may be implemented by software (a program) run on such an apparatus.

The exemplary embodiment has heretofore been described. The technical scope of the invention is not limited to the scope of the exemplary embodiment. From the description of the scope of claims, it is apparent that the technical scope of the invention includes various modifications and improvements made to the exemplary embodiment.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing device comprising:
   at least one processor configured to implement:
   a color data acquisition section configured to acquire color data from a first image output by a first image forming device on a basis of image data;
   a variation acquisition section configured to acquire a degree of color variation of the image data to determine regions exhibiting a high degree of color variation and regions exhibiting a low degree of color variation;
   a misregistration acquisition section configured to acquire an amount of misregistration between the image data and the color data in a region exhibiting the high degree of color variation;
   a first-relationship generation section configured to generate a first relationship in a region exhibiting the low degree of color variation after registration is performed by correcting the misregistration, the first relationship being a relationship between the image data and the color data; and
   a conversion relationship generation section configured to generate a conversion relationship in accordance with the first relationship and a second relationship that corresponds to the first relationship for a second image forming device, the conversion relationship being used for performing color adjustment on a second image to be output by the second image forming device on the basis of the image data, the color adjustment being performed to adjust a color of the second image to match a color of the first image.

2. The color processing device according to claim 1, wherein the misregistration acquisition section is configured to estimate an amount of misregistration between the image data and the color data in the region exhibiting the low degree of color variation from the amount of the misregistration between the image data and the color data in the region exhibiting the high degree of color variation.

3. The color processing device according to claim 2, wherein the first relationship is generated by applying the image data and the acquired color data to a first relationship candidate prepared in advance and by performing matching on the image data and the acquired color data with the first relationship candidate.

4. The color processing device according to claim 1, wherein the misregistration acquisition section is configured to estimate, from amounts of parallel translation between the image data and the color data in the region exhibiting the high degree of color variation, amounts of parallel translation, a ratio of enlargement or reduction, and an angle of rotation between the image data and the color data in the region exhibiting the low degree of color variation.

5. The color processing device according to claim 4, wherein the misregistration acquisition section is configured to calculate an affine transformation coefficient by using a summation of the amounts of the parallel translation except an abnormal value in the region exhibiting the high degree of color variation and estimates, on a basis of the affine transformation coefficient, the amounts of the parallel translation, the ratio of enlargement or reduction, and the angle of rotation between the image data and the color data in the region exhibiting the low degree of color variation.

6. The color processing device according to claim 5, wherein the first relationship is generated by applying the image data and the acquired color data to a first relationship candidate prepared in advance and by performing matching on the image data and the acquired color data with the first relationship candidate.

7. The color processing device according to claim 4, wherein the first relationship is generated by applying the image data and the acquired color data to a first relationship candidate prepared in advance and by performing matching on the image data and the acquired color data with the first relationship candidate.

8. The color processing device according to claim 1, wherein the first relationship is generated by applying the image data and the acquired color data to a first relationship candidate prepared in advance and by performing matching on the image data and the acquired color data with the first relationship candidate.

9. The color processing device according to claim 1, wherein the regions exhibiting the high degree of color variation are different than the regions exhibiting the low degree of color variation.

10. An image forming apparatus comprising:
    at least one processor configured to implement:
    a second image forming device configured to form an image on a recording medium on a basis of image data, the second image forming device being different from a first image forming device that forms an image on a recording medium on a basis of the image data;
    a color adjustment device configured to perform color adjustment on the image to be formed by the second image forming device; and
    a conversion relationship generation device configured to generate a conversion relationship that is used by the color adjustment device to perform the color adjustment,
    the conversion relationship generation device including
    a color data acquisition section configured to acquire color data from a first image output by the first image forming device on the basis of the image data,
    a variation acquisition section configured to acquire a degree of color variation of the image data to determine regions exhibiting a high degree of color variation and regions exhibiting a low degree of color variation,
    a misregistration acquisition section configured to acquire an amount of misregistration between the image data and the color data in a region exhibiting the high degree of color variation,
    a registration section configured to perform registration by correcting the misregistration between the image data and the color data on a basis of the amount of the misregistration,
    a first-relationship generation section configured to generate a first relationship in a region exhibiting the low degree of color variation after the registration is performed by correcting the misregistration, the first relationship being a relationship between the image data and the color data, and
    a conversion relationship generation section configured to generate a conversion relationship in accordance with the first relationship and a second relationship that corresponds to the first relationship for a second image forming device, the conversion relationship being used for performing color adjustment on a second image to be output by the second image forming device on the basis of the image data, the color adjustment being performed to adjust a color of the second image to match a color of the first image.

11. The image forming apparatus according to claim 10, wherein the regions exhibiting the high degree of color variation are different than the regions exhibiting the low degree of color variation.

12. An image forming system comprising:
at least one processor configured to implement:
a first image forming device and a second image forming device each of which are configured to form an image on a recording medium on a basis of image data;
a color adjustment device configured to perform color adjustment on the image to be formed by the second image forming device; and
a conversion relationship generation device configured to generate a conversion relationship that is used by the color adjustment device to perform the color adjustment,
the conversion relationship generation device including
a color data acquisition section configured to acquire color data of a first image output by the first image forming device on the basis of the image data,
a variation acquisition section configured to acquire a degree of color variation of the image data to determine regions exhibiting a high degree of color variation and regions exhibiting a low degree of color variation,
a misregistration acquisition section configured to acquire an amount of misregistration between the image data and the color data in a region exhibiting the high degree of color variation,
a registration section configured to perform registration by correcting the misregistration between the image data and the color data on a basis of the amount of the misregistration,
a first-relationship generation section configured to generate a first relationship in a region exhibiting the low degree of color variation after the registration is performed by correcting the misregistration, the first relationship being a relationship between the image data and the color data, and
a conversion relationship generation section configured to generate a conversion relationship in accordance with the first relationship and a second relationship that corresponds to the first relationship for a second image forming device, the conversion relationship being used for performing color adjustment on a second image to be output by the second image forming device on the basis of the image data, the color adjustment being performed to adjust a color of the second image to match a color of the first image.

13. The image forming system according to claim 12, wherein the regions exhibiting the high degree of color variation are different than the regions exhibiting the low degree of color variation.

* * * * *